(12) United States Patent
Ohana

(10) Patent No.: US 10,507,534 B2
(45) Date of Patent: Dec. 17, 2019

(54) SYSTEMS, METHODS, AND APPARATUS FOR RELIABLY INSTALLING SURVEY TAGS

(71) Applicant: O-TAGS, INC., Monarch Beach, CA (US)

(72) Inventor: Teddy Ohana, Monarch Beach, CA (US)

(73) Assignee: O-TAGS, Inc., Monarch Beach, CA (US)

(*) Notice: Subject to any disclaimer, the term of this patent is extended or adjusted under 35 U.S.C. 154(b) by 78 days.

(21) Appl. No.: 15/462,313

(22) Filed: Mar. 17, 2017

(65) Prior Publication Data
US 2017/0266736 A1 Sep. 21, 2017

Related U.S. Application Data

(60) Provisional application No. 62/309,911, filed on Mar. 17, 2016.

(51) Int. Cl.
| | | |
|---|---|---|
| *B23B 51/10* | (2006.01) | |
| *B28D 1/14* | (2006.01) | |
| *G01C 15/04* | (2006.01) | |

(52) U.S. Cl.
CPC .......... *B23B 51/104* (2013.01); *B23B 51/108* (2013.01); *B28D 1/146* (2013.01);
(Continued)

(58) Field of Classification Search
CPC ..... B23B 51/10; B23B 51/104; B23B 51/107; B23B 51/108; B23B 2251/606; B23B 2260/114; B28D 1/146
(Continued)

(56) References Cited

U.S. PATENT DOCUMENTS

| 1,017,352 A | 2/1912 | Wagner |
|---|---|---|
| 2,237,901 A | 4/1941 | Chun |

(Continued)

FOREIGN PATENT DOCUMENTS

| EP | 0171830 A1 * | 2/1986 | ........... B23B 49/005 |
|---|---|---|---|
| GB | 191125372 A * | 7/1912 | ........... B23B 51/104 |

OTHER PUBLICATIONS

Goebel, Paul E.; "It's Time to Get the Lead Out—Making the Change to Berntsen BP Series Bronze Markers"; Survey Notes, California Land Surveyors Association, San Diego, Jan. 2017, vol. 23, Iss. 1; pp. 3-4.

(Continued)

*Primary Examiner* — Alan Snyder
(74) *Attorney, Agent, or Firm* — Alford Law Group, Inc.; William E. Alford

(57) ABSTRACT

In one embodiment, a system includes a counterbore drill bit, pre-cut lead rods of predetermined length, and a tapper tool. The counterbore drill bit includes a stop collar to drill counter bored holes with a first hole portion having a first diameter to a first depth below a surface of a material and a second hole portion having a second diameter less than the first to a second depth below the surface. The lead rods are inserted into the counter bored holes. The tapper tool mashes the second end of each lead rod in the one or more counterbored holes to expand and friction fit then in the counter bored holes. The system further includes circular survey tags insertable into the first hole and fasteners with a head and a shaft insertable through a center hole in the survey tags to retain the tags coupled to the lead rods.

19 Claims, 28 Drawing Sheets

(52) U.S. Cl.
 CPC .......... *G01C 15/04* (2013.01); *B23B 2226/75* (2013.01); *B23B 2251/606* (2013.01); *B23B 2260/0482* (2013.01)

(58) Field of Classification Search
 USPC ........................................................ 408/202
 See application file for complete search history.

(56) References Cited

U.S. PATENT DOCUMENTS

| | | | |
|---|---|---|---|
| 2,332,295 A | | 10/1943 | Bouchal |
| 2,600,286 A | | 6/1952 | Weiland |
| 2,673,714 A | | 3/1954 | Hargrave |
| 2,858,109 A | | 10/1958 | Tengberg |
| 2,865,606 A | | 12/1958 | Farmer |
| 2,879,036 A | | 3/1959 | Wheeler |
| 3,199,381 A | | 8/1965 | Mackey |
| 3,592,555 A | | 7/1971 | Mackey, Sr. |
| 3,674,101 A | | 7/1972 | Chromy |
| 3,773,122 A | | 11/1973 | Chromy |
| 4,291,774 A | | 9/1981 | Sudnishnikov |
| 4,503,920 A | | 3/1985 | Clement |
| 4,568,277 A | | 2/1986 | MacInnes |
| 4,710,075 A | * | 12/1987 | Davison ................ A61B 17/16 33/512 |
| 4,729,441 A | | 3/1988 | Peetz |
| 4,878,788 A | | 11/1989 | Wakihira |
| 4,911,729 A | | 3/1990 | Rooker |
| 4,924,593 A | | 5/1990 | Renker |
| 4,924,931 A | | 5/1990 | Miller |
| 4,951,761 A | | 8/1990 | Peetz |
| 4,968,193 A | | 11/1990 | Chaconas |
| 4,984,944 A | | 1/1991 | Pennington, Jr. |
| 5,031,709 A | * | 7/1991 | Fischer ............... B23B 51/0027 175/325.5 |
| 5,056,967 A | | 10/1991 | Hageman |
| 5,181,811 A | | 1/1993 | Hosoi |
| 5,269,387 A | | 12/1993 | Nance |
| 5,375,672 A | | 12/1994 | Peay |
| 5,403,130 A | | 4/1995 | Moser |
| 5,423,640 A | | 6/1995 | Lindblom |
| 5,482,124 A | | 1/1996 | Haussmann |
| 5,492,187 A | | 2/1996 | Neukirchen |
| 5,570,978 A | | 11/1996 | Rees |
| 5,836,410 A | | 11/1998 | Kleine |
| D415,774 S | | 10/1999 | Wakai |
| 6,089,337 A | | 7/2000 | Kleine |
| 6,102,634 A | * | 8/2000 | Turner ................ B23B 51/0009 175/389 |
| 6,374,931 B1 | | 4/2002 | Nieves |
| D525,272 S | | 7/2006 | Duscha |
| D531,650 S | | 11/2006 | Switzer |
| D688,715 S | | 8/2013 | Lampe et al. |
| D723,076 S | | 2/2015 | Lampe et al. |
| D725,164 S | | 3/2015 | Guerriero |
| 2005/0207856 A1 | * | 9/2005 | Wienhold ............. B23B 49/005 408/191 |

OTHER PUBLICATIONS

Relton Corporation; Relton Corporation Catalog; 2011; 32 pages.
Michigan Drill; Glossary of Terms, Downloaded Feb. 8, 2016; http://www.michigandrill.com/tech/twist_drills/glossary.php; 3 pages.
Wikipedia; "Drill bit"; Downloaded Oct. 4, 2015; https://en.wikipedia.org/wiki/Drill_bit; 23 pages.
Wikipedia; "Drill bit shank"; Downloaded Oct. 4, 2015;https://en.wikipedia.org/wiki/Drill_bit_shank; 5 pages.
Berntsen; Online Catalog; Countersink Drill Bit (Part. No. BPMDRL) and BP Series Markers; Downloaded Sep. 30, 2015; 3 pages.
Amana Tool; "Amana Tool's New Countersink Features a Non-marring Adjustable Depth Stop with No-Thurs Ball Bearing"; Press Release Mar. 20, 2013; 1 page; Downloaded from https://web.archive.org/web/20130826145846/http://www.amanatool.com/press-releases/pr-55225-no-mar-countersink.html.
Amana Tool; "Carbide Tipped Countersink with No Burning and Marring Adjustable Depth Stop with No-Thrust Ball Bearing"; Online Catalog Page; Copyright 2013; 1 page; Downloaded from https://web.archive.org/web/20130709074624/http://www.amanatool.com/boring/55225-countersink-with-adjustable-depth-stop-non-marring.html.

* cited by examiner

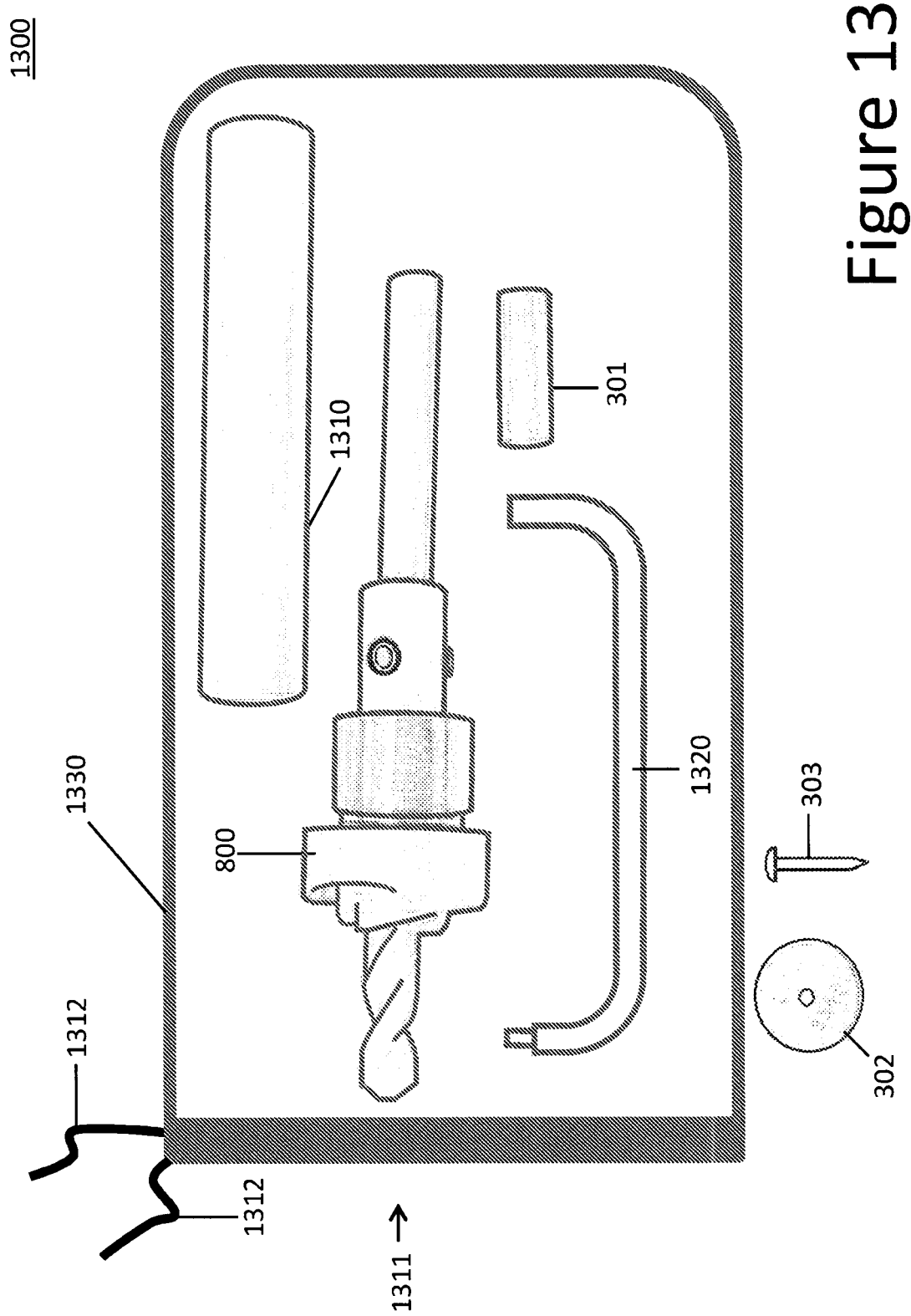

SYSTEMS, METHODS, AND APPARATUS FOR RELIABLY INSTALLING SURVEY TAGS

CROSS-REFERENCE TO RELATED APPLICATIONS

This non-provisional United States (U.S.) patent application claims the benefit of U.S. Provisional Patent Application No. 62/309,911, titled SYSTEMS, METHODS, AND APPARATUS FOR INSTALLING SURVEY TAGS, filed on Mar. 17, 2016 by inventor Teddy Ohana.

FIELD

The embodiments of the invention relate generally to drill bits for boring counterbore holes into various materials.

BACKGROUND

Land surveyors often need to mark points of land to survey property lines and other features of the land. A marker, referred to as a monument or survey tag, may be coupled to a material affixed to the land, such as masonry, for example. The markers indicate a center point where a survey instrument is to be placed to take measurements.

It takes some time and effort to couple a monument or survey tag to materials that are affixed to the land. Oftentimes, a survey tag is poorly coupled and easily dislodged from the material, such that the survey tag is lost over time. Property lines are often unknown without a survey tag identifying a marked point thereof. When a survey tag is lost, the prior survey is no longer valid. A new survey tag is often needed to survey the property again and identify property lines.

It is desirable to quickly couple survey tags to materials affixed to land in a more reliable manner.

BRIEF SUMMARY

The embodiments are summarized by the claims that follow below.

BRIEF DESCRIPTIONS OF THE DRAWINGS

FIG. 13 is a surveyor's kit including an adjustable counterbore drill bit tool.

DETAILED DESCRIPTION

In the following detailed description of the embodiments of the invention, numerous specific details are set forth in order to provide a thorough understanding of the embodiments of the invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

The embodiments of the invention includes methods, apparatus, kits, and systems for reliably installing survey tags to various materials.

Figure 1A:
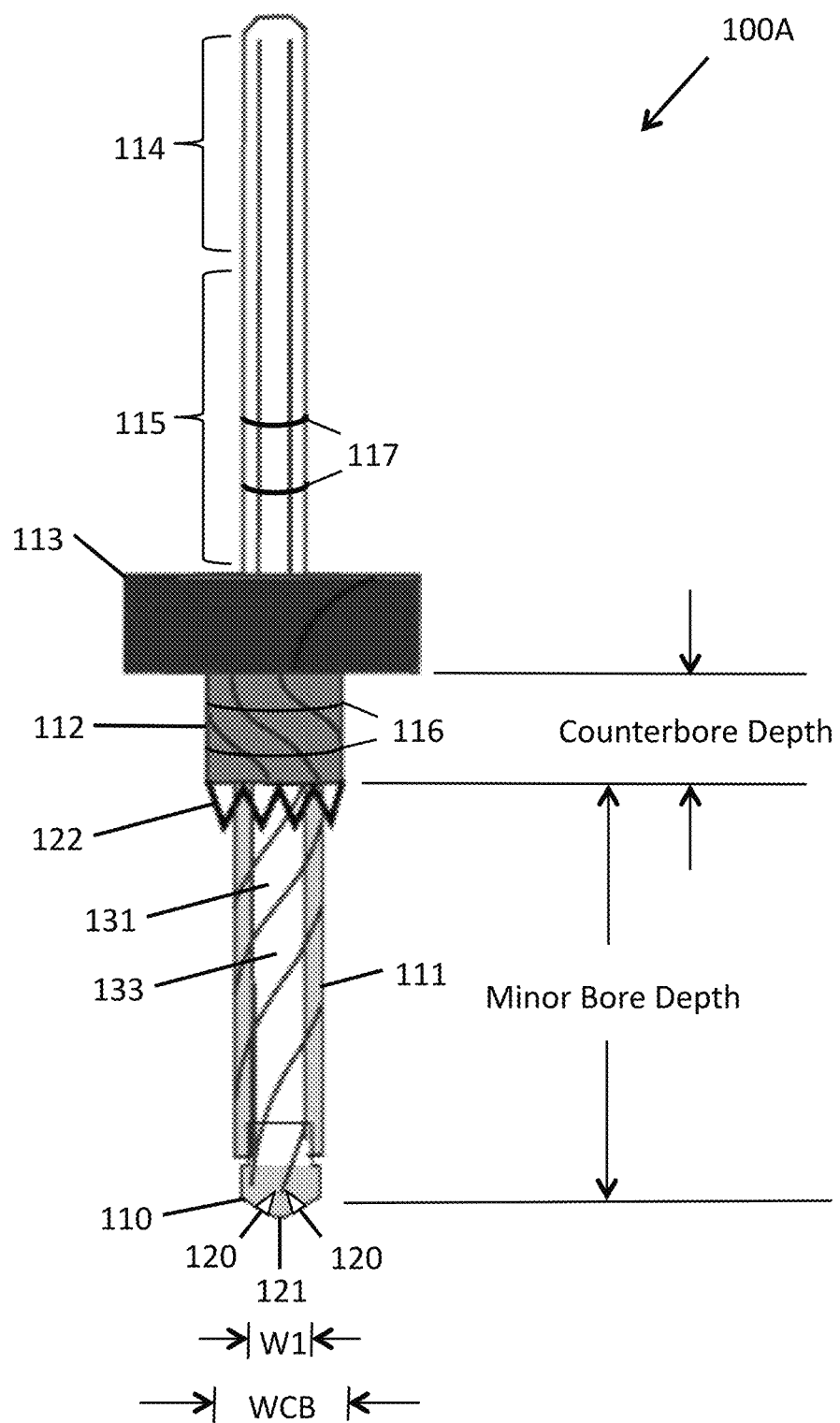
FIGS. 1A-1B are schematic diagrams of a counterbore drill bit with stop collar.

Referring now to FIG. 1A, a step stage drill bit 100A (also referred to herein as a counterbore drill bit with stop collar) with two cutting stages is illustrated. The drill bit 100A is a durable non-water high speed masonry drill bit to cut through masonry, such as concrete. The drill bit 100A includes a carbide drill bit tip 110, a twisted drill cutting shaft portion (body or flute portion) 111, a counterbore cutter 112, a stop collar 113, and a shaft including a neck portion 115, and a chuckable shank portion 114. The twisted drill cutting shaft portion 111 includes alternating lands 131 and flutes 133.

The carbide drill bit tip 110 may include one or more pairs of opposing notched V-shaped grooves 120 about a point 121 to keep the drill centered at a point and avoid walking or runout away from a desired drill point. The notched grooves 120 may have a V-shape to form V-shaped grooves. The diameter W1 of the twisted drill cutting shaft portion 111 can vary from one-eight inch, three-eights inch, one half inch, three-fourths inch, one inch, or more. The chuckable shank portion 114 of the step stage drill bit 100A may have similar diameters to be received by various drill tools. In other embodiments, the diameters of the twisted drill cutting shaft portion 111 and the chuckable shank portion 114 may differ (e.g., cutting shaft portion 111B of drill bit 100B).

The counterbore cutter 112 may cut to form a counterbore with a flat even finish to receive a survey tag. The counterbore cutter 112 includes a plurality of carbide cutting tips mounted around a circumference of the cutting end of the cutting tool. A range of predetermined diameters W2 of the counterbore cutter 112 is from one half (0.5) inch to one and one quarter (1.25) inches (e.g., 0.5, 0.75, 1.0, or 1.25 inches) in response to the slightly smaller diameter of various sized survey tags. The diameter of counterbore cutter 112 cuts a circular opening with a similar diameter (e.g., 0.5, 0.75, 1.0, or 1.25 inches).

The stop collar 113 includes a thickness $t_h$ to provide strength against the surface of the material into which the survey tag hole is bored. The various materials into which the survey tag hole is bored includes cement, concrete, masonry, asphalt, granite, brick, tile, metal, and metal alloy. A predetermined diameter of the stop collar 113 is greater than the predetermined diameter of the counterbore cutter 112, such as between one-fourth of an inch and three-eights of an inch greater in diameter. Accordingly, a range of predetermined diameters of the stop collar 113 is from three quarters (0.75) of an inch to one and five-eights (1.625) inches in response to the various sized survey tags.

The stop collar 113 may be integrated with the drill bit of the counterbore cutter 112 in a fixed position. A counterbore depth may range between one-sixty-fourth of an inch and one inch (e.g., ¹⁄₆₄, ¼, or 1 inch). In an alternate embodiment, the stop collar 113 may be adjustable along the counterbore cutter 112 to set different depths of the counterbore hole. The counterbore cutter 112 may include rings or lines 116 indicating the positions at which the stop collar 113 may be set to cut at one or more predetermined counterbore depths.

The counterbore cutter 112 may be fixed in position to start cutting at a predetermined depth (e.g., minor bore depth of ¼, 1, or 1.5 inches) with respect to the tip of the drill bit 100A. A minor bore depth may range between one quarter of an inch and one and one-half inches (e.g., ¼, 1, or 1.5 inches). In an alternate embodiment, the counterbore cutter 112 may be adjustable to begin cutting at different depths. The shaft of the drill bit may include one or more rings or lines 117 cut into the shaft indicating the positions at which counterbore cutter 112 can be set to begin cutting at one or more predetermined depths. As explained elsewhere herein, a retention split ring may be coupled to the shaft within one of the one or more rings or lines 117 cut into the shaft (see retaining split ring 804 and the one or more aligned groove segments 819). For example, a minor bore depth may set to ¼ inch, 1 inch, or 1.5 inches. The minor bore may have more than one portion with different hole diameters W1,W2 along its depth. The total depth of the minor bore relative to the surface is the sum of the counterbore depth and the minor bore depth.

Figure 4A:
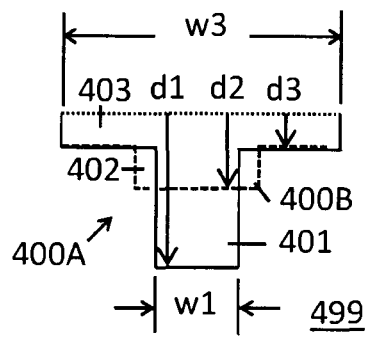
FIGS. 4A-4F are diagrams of a method for installing a survey tag with the counterbore drill bit with stop collar.

The counterbore drill bit 100A with its stop collar generally bores a first hole with a first diameter W1 to a first depth and then starts drilling a counterbore hole with a second diameter WCB concentric with the first hole. Up to the stop collar, the counterbore drill bit 100A drills the counterbore hole with the second diameter WCB greater than the first diameter W1 to a predetermined counterbore depth and further drills the first hole with the first diameter to a second depth equal to the first depth and the counterbore depth. Generally, FIG. 4A illustrates a schematic diagram of a counterbore hole 400A that can be made with the counterbore drill bit 100A with stop collar.

The counterbore drill bit 100A of FIG. 1A illustrates two steps of drilling different diameters W1,WCB of openings. More than two steps of drilling different diameters of openings may be drilled by the counterbore drill bit 100B of FIG. 1B. For example, FIG. 4A also illustrates a schematic diagram of a counterbore hole 400B that can be made with the counterbore drill bit 100B with stop collar, for example.

Figure 1B:
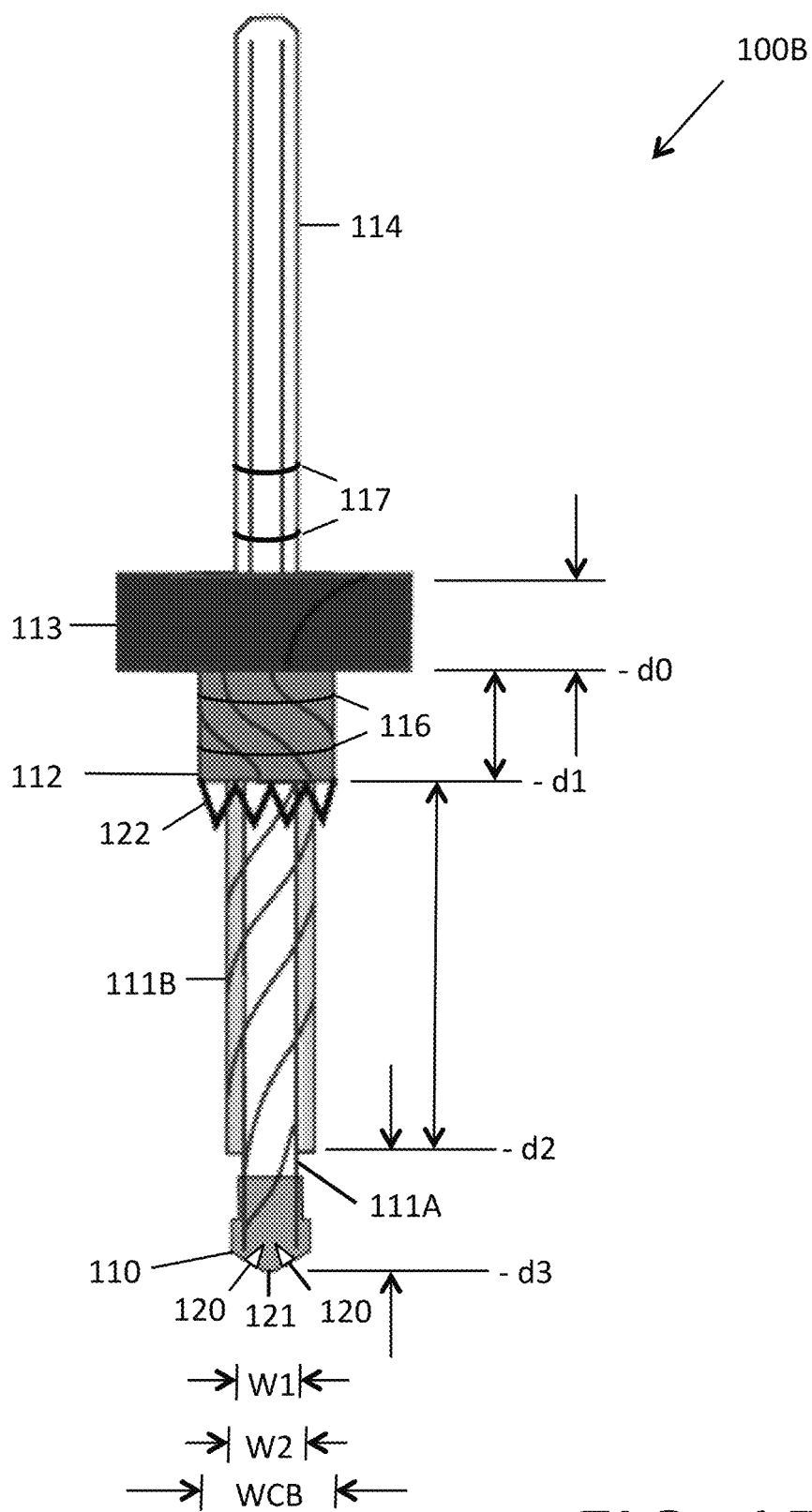

In FIG. 1B, the counterbore drill bit 100B includes a first twisted drill cutting shaft portion 111A, and a second twisted drill cutting shaft portion 111B. The first twisted drill cutting shaft portion 111A bores a hole with a first diameter W1 while the second twisted drill cutting shaft portion 111B bores a hole with a second diameter W2 greater than the first.

The counterbore drill bit 100B further includes the carbide drill bit tip 110, the counterbore cutter 112, the stop collar 113, and the chuckable shank portion 114 as described herein with reference to FIG. 1A. The counterbore cutter 112 has a diameter WCB to cut a counterbore hole of a similar diameter. Accordingly, the counterbore drill bit 100B of FIG. 1B illustrates three steps of drilling different diameters W1,W2,WCB of openings.

Figure 2:
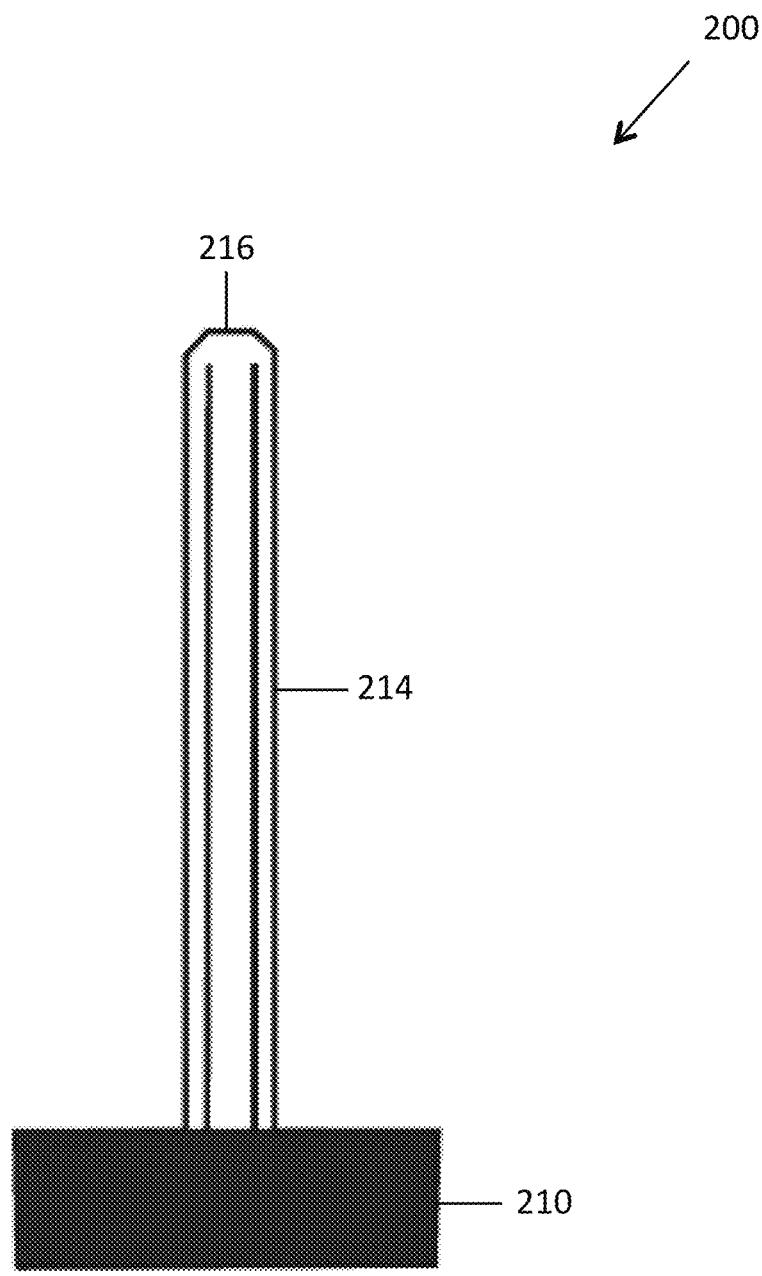
FIG. 2 is a schematic diagram of a tapper tool.

Referring now to FIG. 2, a tamping or tapper tool 200 is shown with a circular cylindrical head 210 coupled to an end of a shaft 214. Another end 216 of the shaft 214 receives blows from a hammer to flatten an end of a precut lead rod and tap down a survey tag into the counterbore formed by the drill bit 100A-100B.

Figure 3A:
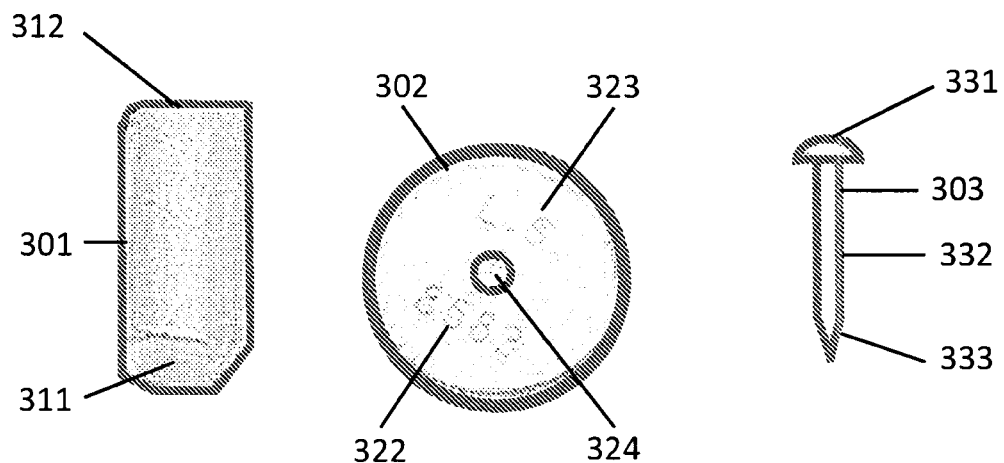
FIG. 3A-3B are perspective views of elements of a system for installing circular survey tags.

Referring now to FIG. 3A, elements for fastening a circular survey tag into a bore of a material are shown. The elements include a precut lead rod 301, a circular survey tag 302, and a fastener 303 to couple the survey tag to the lead rod 301.

Figure 3B:
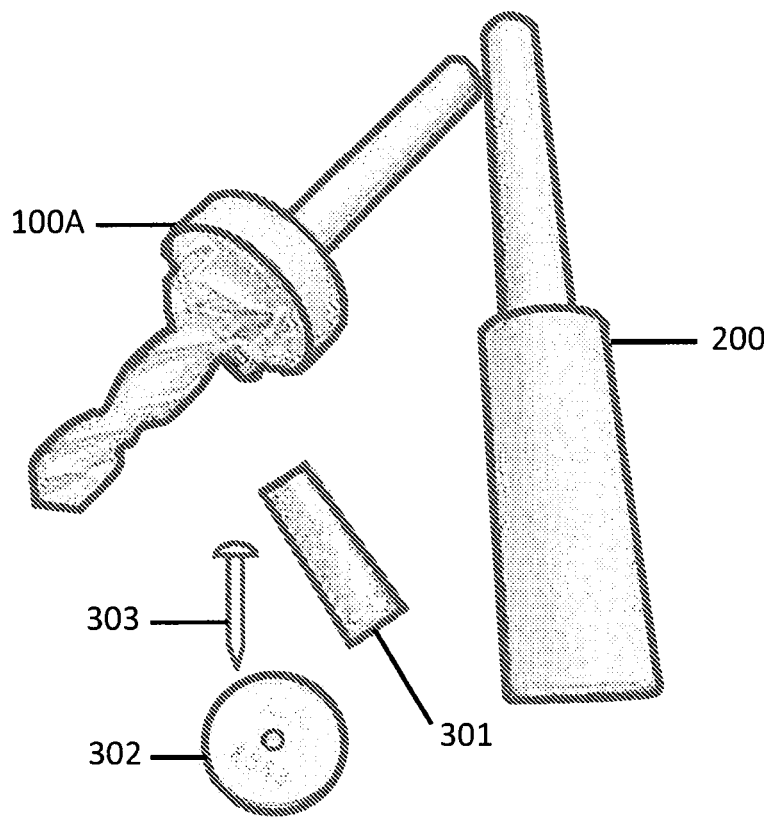

FIG. 3B illustrates a kit including the precut lead rod 301, the circular survey tag 302, the fastener 303, the drill bit 100A for a power drill, and a tamping tool 200 for a hammer.

The precut lead rod 301 has a predetermined length with opposing ends 311-312. A diameter of the lead rod 301 is slightly less than a diameter of the first hole bored with the drill bit 100A-100B. Accordingly, the diameter of the lead rod 301 is predetermined to readily fit into the diameter of the first hole through the counterbore hole. The diameter of the precut lead rod 301 is slightly less than the diameter of the minor bore hole. The length of the precut lead rod 301 is less than the total depth of the bore, the sum of the minor bore depth and the counterbore depth. For example, the length of precut lead rod 301 may range from one-sixteenth (¹⁄₁₆) of an inch to one and one half (1.5) inches.

The diameter of the fastener 303, a brass nail, is less than the diameter of the precut lead rod 301. The length of the fastener 303 may be less than, greater than, or equal to the length of the precut lead rod 301. For example, the length of the fastener 303 may range from one-fourth (¼) of an inch to one and one quarter (1.25) inches. The outer diameter of the tag is three fourths (¾) of an inch or thirteen-sixteenths (¹³⁄₁₆) of an inch in accordance with one embodiment. Other embodiments of the survey tag may have different measurements of outer diameters. The inner diameter of the hole in the survey tag is larger than the diameter of the shaft 332 of the fastener 303 so that it can be inserted into the hole in the survey tag.

The survey tag 302 may be formed of brass to withstand the outdoor environmental elements. The survey tag 302 includes a license number 322 (e.g., 8583), initials (LS) 323 for land surveyor, and a center opening 324. The license number 322 identifies the survey tag 302 with the land surveyor. The center opening 324 receives the fastener 303 to couple the fastener and the tag 302 together to the lead rod 301 and the material into which the hole is bored.

FIGS. 4A-4F are diagrams of a method for installing a survey tag with the counterbore drill bit with the stop collar. The shank 114 of the drill bit 100A-100B is chucked into the chuck of a drill. The tip of the drill bit 100A-100B is aligned with a point on a top surface of a material 499 where the center of the survey tag is to be affixed. The material 499 is a hard material such as cement, concrete, masonry, asphalt, granite, brick, tile, metal, or metal alloy, for example.

FIG. 4A illustrates how the drill bit 100A-100B may be used with the drill to bore a counterbored hole 400A-400B into a material 499. FIGS. 4B-4F illustrate the further processes of coupling a survey tag to the material 499 of ether counterbored hole 400A-400B.

In FIG. 4A, the counterbored hole 400A includes a first circular cylindrical hole 401 and a counterbore circular cylindrical hole 403. The first circular cylindrical hole 401 has a hole depth d1 and a diameter w1. The counterbore circular cylindrical hole 403 has a counterbore depth dCB and a diameter wCB. The diameter wCB of the counterbore circular cylindrical hole 403 is greater than the diameter w1 of the first circular cylindrical hole 401.

The counterbored hole 400B includes the first circular cylindrical hole 401 with the hole depth d1; a second circular cylindrical hole 402 with a hole depth d2; and the counterbore circular cylindrical hole 403 with a counterbore depth d3. The diameter of the counterbore circular cylindrical hole 403 is greater than the diameter of the second circular cylindrical hole 402 and the first circular cylindrical hole 401. The diameter of the second circular cylindrical hole 402 is greater than the diameter of the first circular cylindrical hole 401.

Figure 4B:
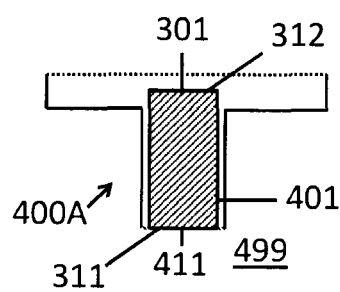

In FIG. 4B, one end 311 of the precut lead rod 301 is inserted into the first hole 401 that was bored with the drill bit 100A-100B to rest against the bottom 411 of the hole in the material 499. A portion of the lead rod 301 extends upward above a bottom surface of the counterbore hole 403. A portion of the lead rod 301 may slightly extend above or not a top surface of the material 499.

Figure 4C:
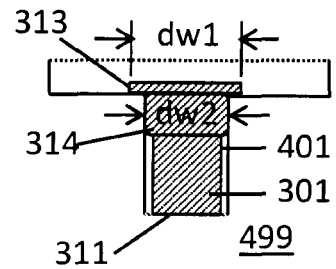

The tamping tool 200 is placed onto the opposite end 312 of the precut lead rod 301. A hammer strikes the end of the tamping tool 200 to mash the end 312 of the lead rod 301 down, shortening the length of the rod, such as shown in FIG. 4C, and expanding the diameters (dw1,dw2) of portions 313,314 of the rod, such as shown in FIG. 4C. The diameter dw1 of the portion 313 of the rod 301 is extended out and expanded beyond the sides of the first hole 401. The diameter dw2 of the portion 314 of the rod 301 is expanded against the sides of the first hole 401 to make a friction fit and couple the rod 301 to the material 499.

Figure 4D:
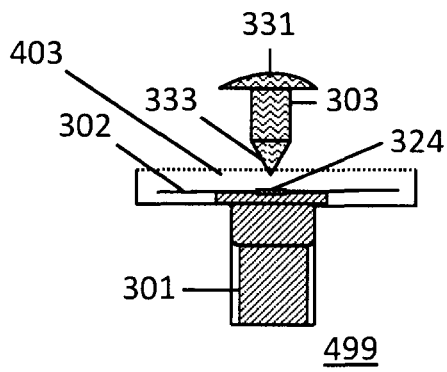

In FIG. 4D, the survey tag 302 is positioned within the counterbore hole 403 such that the center opening 324 of the tag 302 is over the lead rod 301 within the hole 411. The pointed end 333 of the fastener 303 is aligned with the center opening 324 of the tag 302.

Figure 4E:
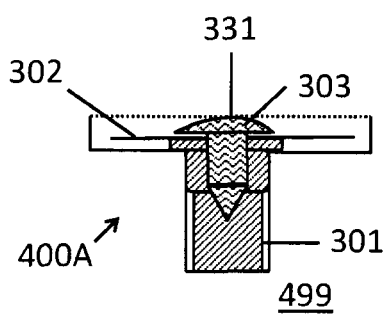

A hammer is used to strike the head 331 of the fastener 303 driving its pointed end 333 and shaft 303 down into the lead of the lead rod 301 within the hole 301, coupling the fastener 303, the tag 302 and the lead rod 301 together, such as shown in FIG. 4E. The pointed end 333 and shaft 303 of the fastener 303 further expand portions of the diameter of the lead rod 301 within the hole 401 to further couple the lead rod 301, the tag 302, and the fastener 303 together to the material 499. The precut lead rod 301 that anchors the tag 302 and the fastener 303 in the hole to the material 499 may be alternatively referred to herein as a lead anchor.

As shown in FIG. 4E, both the head 331 of fastener 303 and the survey tag 302 are below the top surface of the material 499 into which the counterbore holes are bored. This is so the fastener 303 and the survey tag 302 can avoid being damaged or removed by external forces applied to the top surface of the material. For example, survey tags are often placed in intersections of roads over which tires of cars roll over. With the fastener 303 and survey tag 302 below the top surface, the force of tires for example, such as from acceleration or deceleration of a car, is avoided being transferred to the fastener 303 and the survey tag 302. As another example, survey tags are often placed in concrete or cement, such as a sidewalk or a curb. If not below the surface of the concrete or cement, the survey tag may be inadvertently scraped off the surface of the concrete or cement by tools or equipment, such as a broom, a shovel, gardening implement, or a street sweeper. If scraped off, a second land survey is often required to place a new survey tag to determine properly survey lines.

Figure 4F:
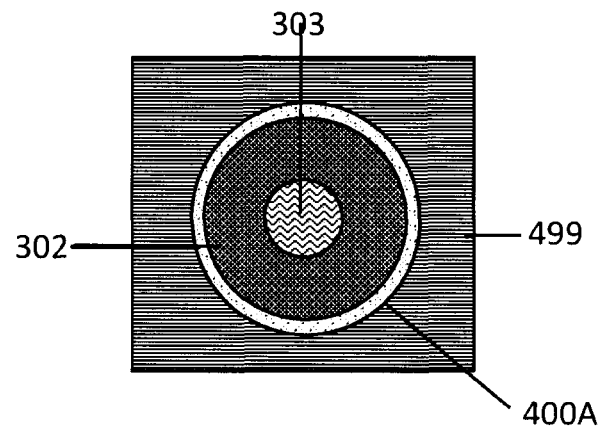

In FIG. 4F, a top view of the fastener 303 and the survey tag 302 is shown within the counterbore hole 400A in the material 499. The fastener 303 and the survey tag 302 are below the top surface of the material 499, such as concrete.

FIGS. 5A-5J are views of an embodiment of the counterbore drill bit with stop collar 100A. The drill bit 100A includes the carbide drill bit tip 110, the twisted drill cutting shaft portion 111, the counterbore cutter 112, the stop collar 113, and the chuckable shank portion 114.

The counterbore cutter 112 and the stop collar 113 are coupled together to form a counterbore hole of a predetermined depth. They are adjustable together along the shaft 114 of the drill bit to adjust the depth of the first hole. The stop collar 113 includes one or more threaded openings 512 around its circumference into which one or more threaded set screws 513 are threaded. The tip of each set screw 513 can be tightened against the shaft 114 to hold the predetermined position of the counterbore cutter 112 and the stop collar 113.

In FIG. 5D,5F,5H,5I, the carbide drill bit tip 110 includes a pair of opposing notched grooves 120. The carbide drill bit tip 110 is a flat A-frame-shaped (or inverted V-shaped) blade. The end of the twisted drill cutting shaft 111 has a slot 550 into which the flat A-frame-shaped tungsten carbide blade is inserted. The tungsten carbide blade 110 is brazed to the steel, a high speed steel alloy for example, of the twisted drill cutting shaft 111.

The A-frame-shaped blade of carbide drill bit tip 110 has opposing cutting edges. Each of the opposing cutting edges has one or more v-shaped grooves 120 of increasing depth. The v-shaped groove 120 increases in depth from a front side edge to a back side edge of the cutting blade.

Figure 5A:
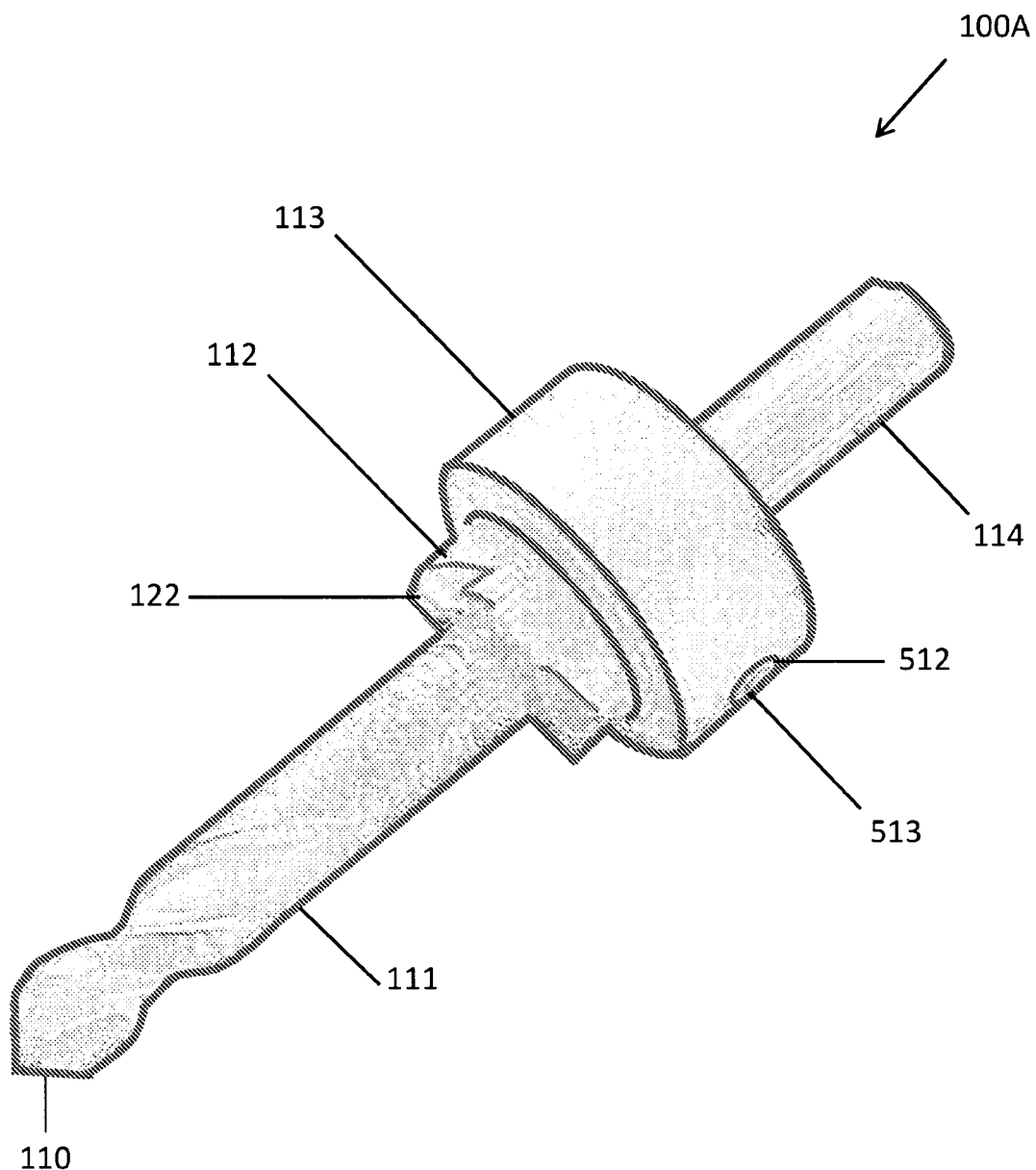
FIGS. 5A-5J are views of the counterbore drill bit with stop collar.
Figure 5B:
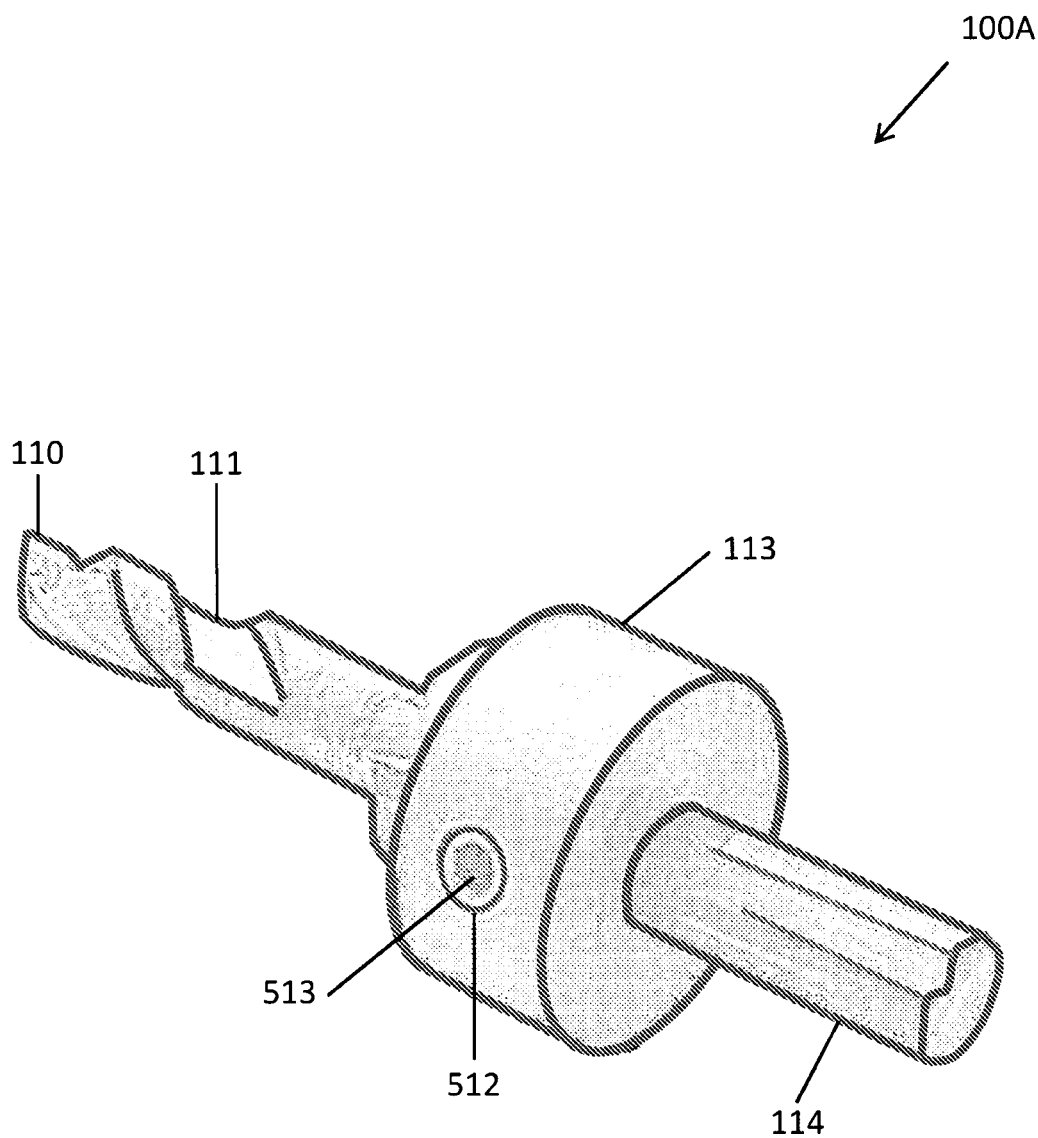
Figure 5C:
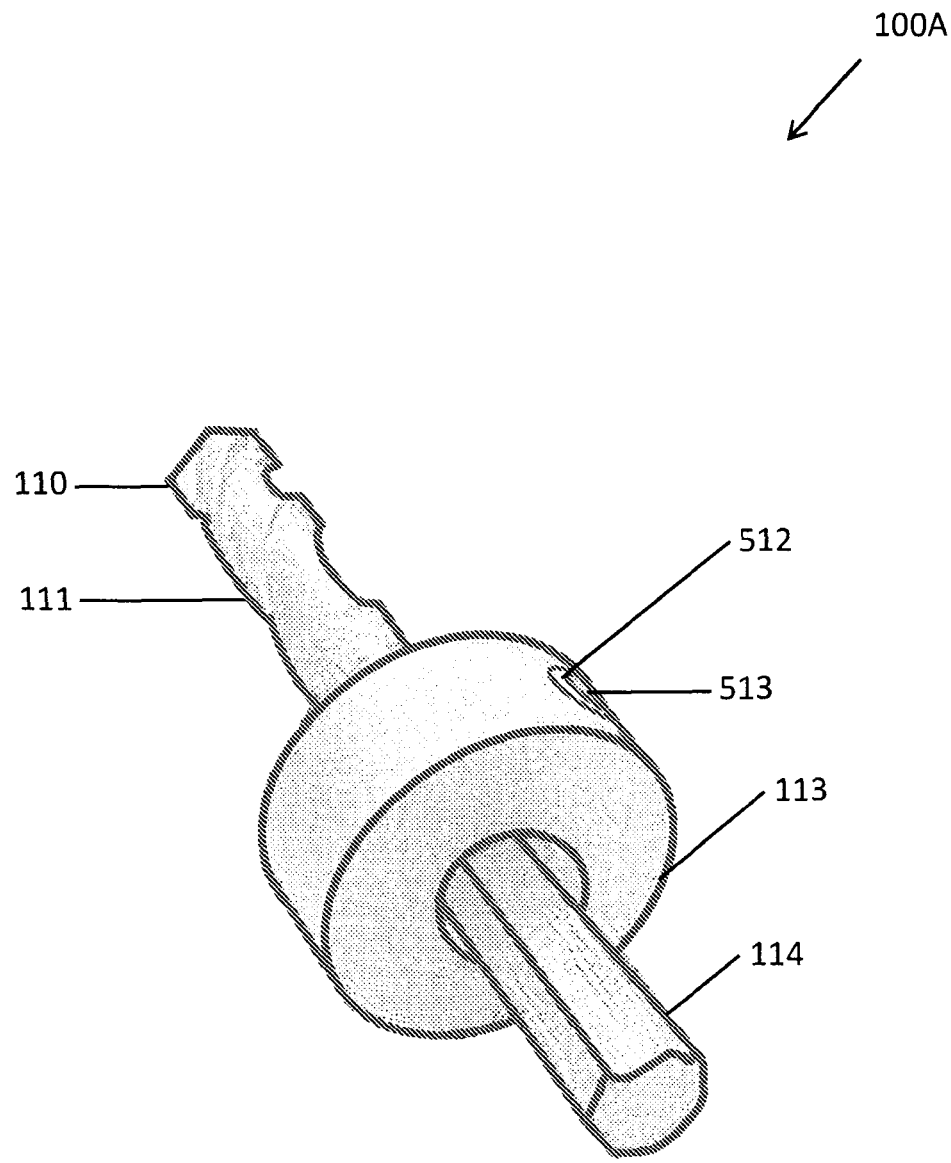
Figure 5D:
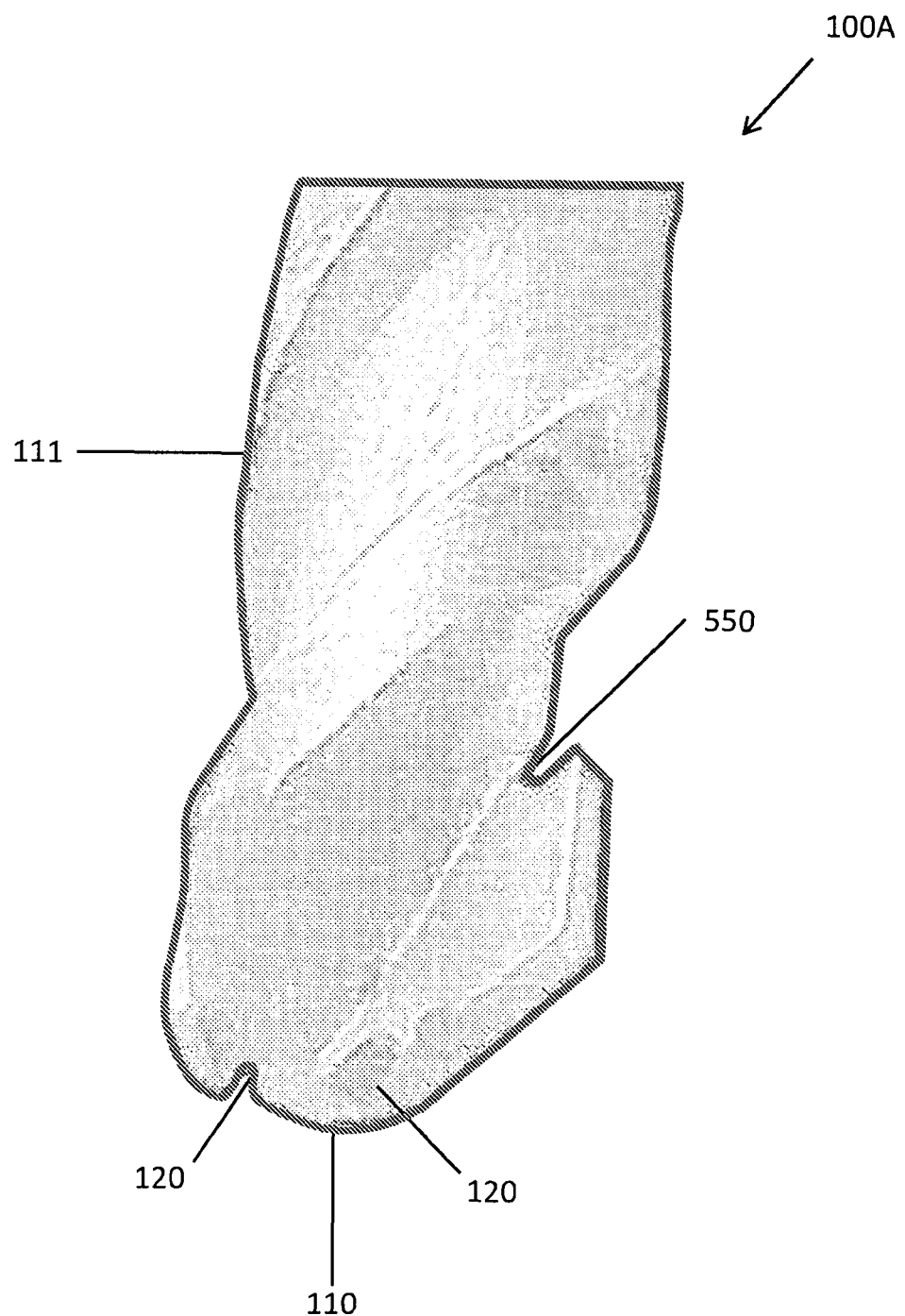
Figure 5E:
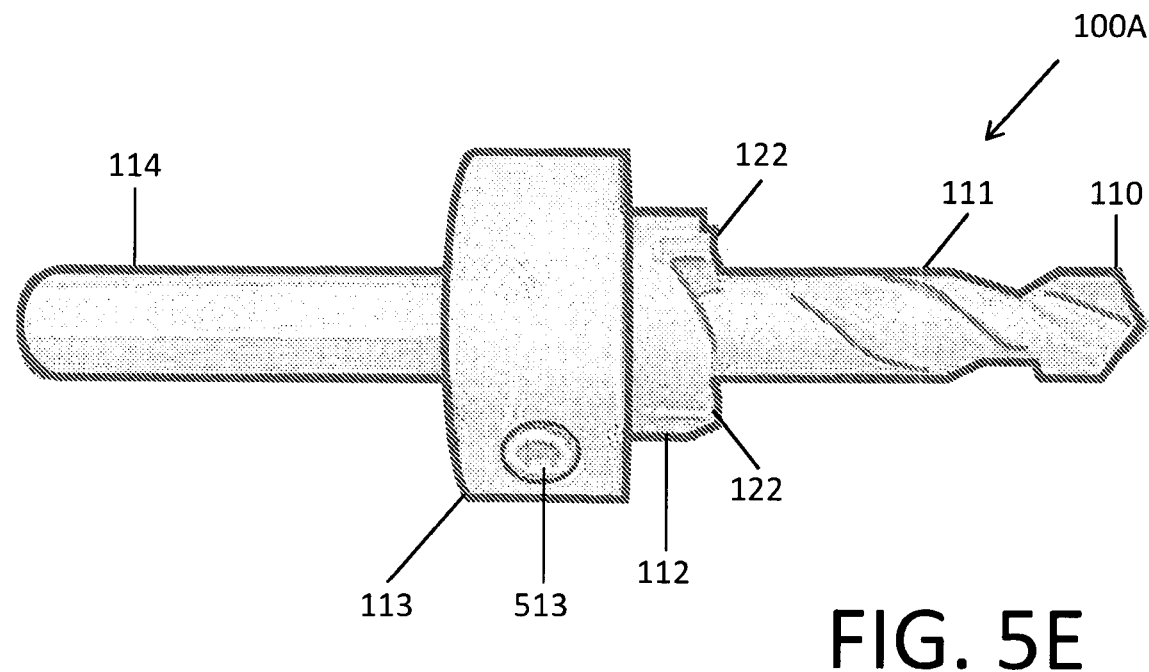
Figure 5F:
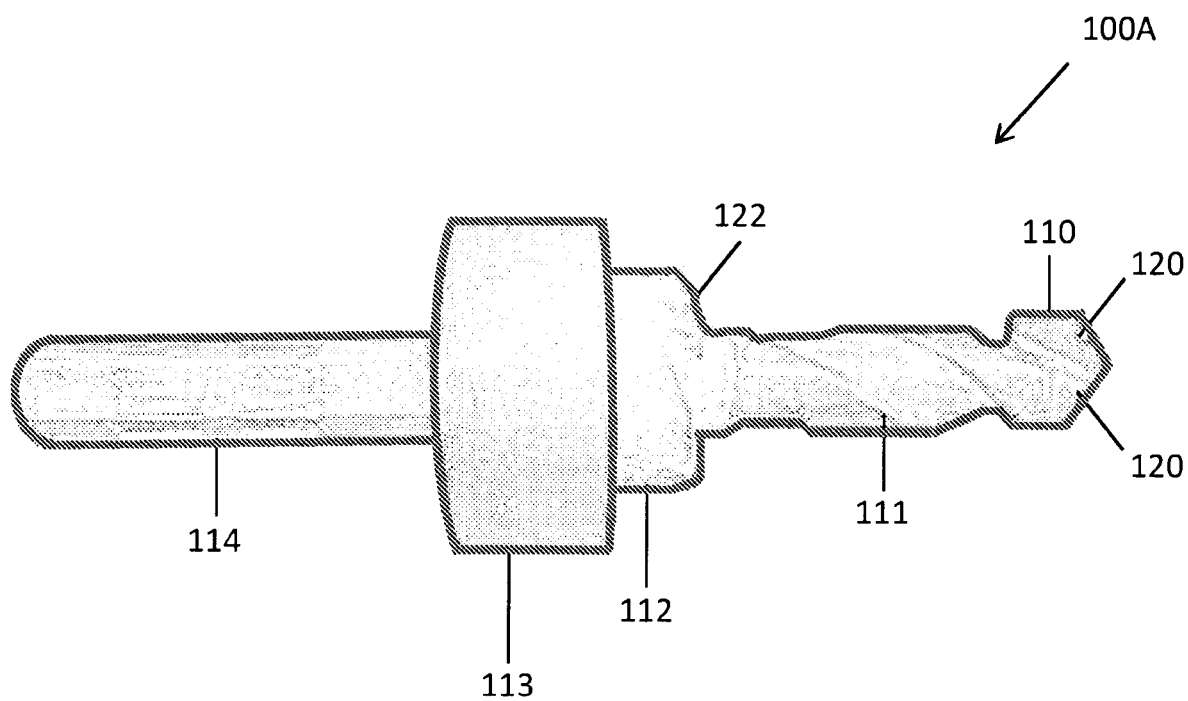
Figure 5G:
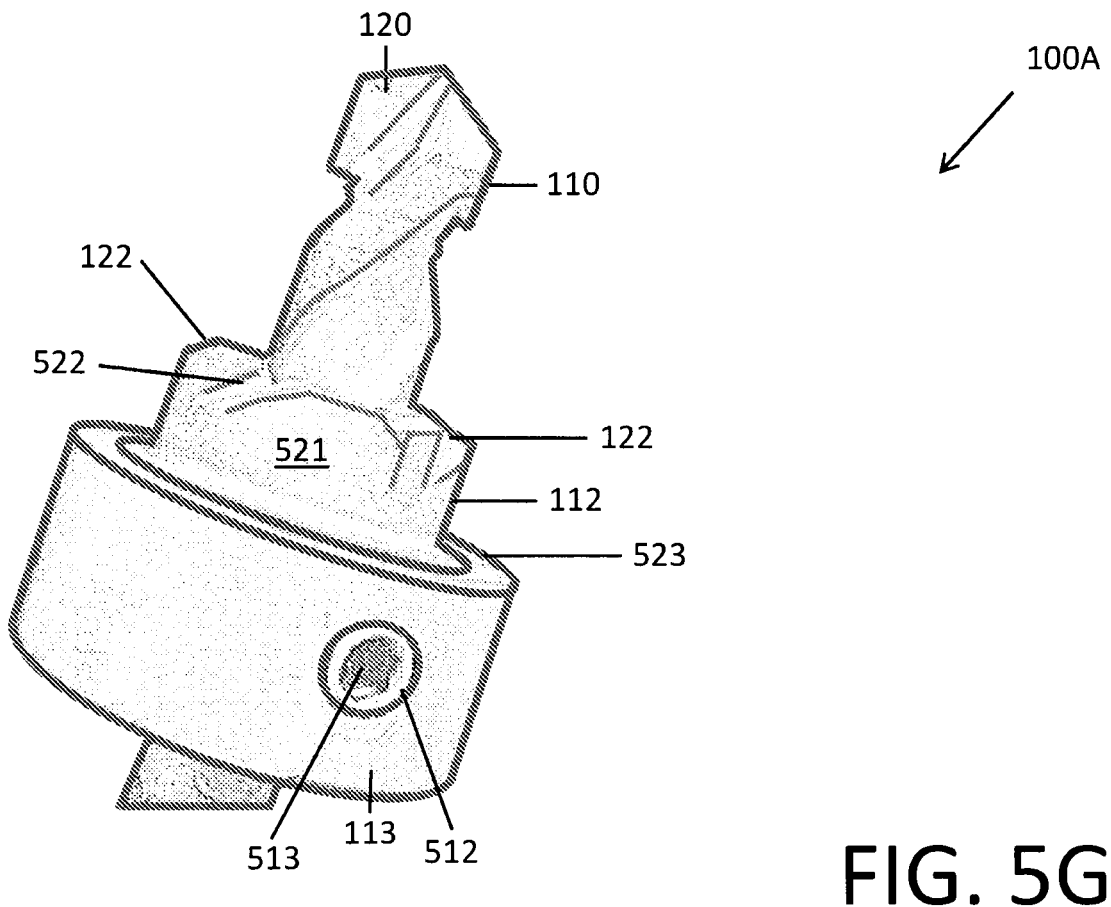

In FIG. 5G, the counterbore cutter 112 includes a plurality of cuboid tungsten carbide blades 122 spaced about the circumference of a steel body 521 formed of a high speed steel alloy for example. A ramp 522 is cut in the body 521 leading down to each rectangular tungsten carbide blade 122. Each rectangular tungsten carbide blade 122 is brazed to the carbide steel body 521.

Figure 5H:
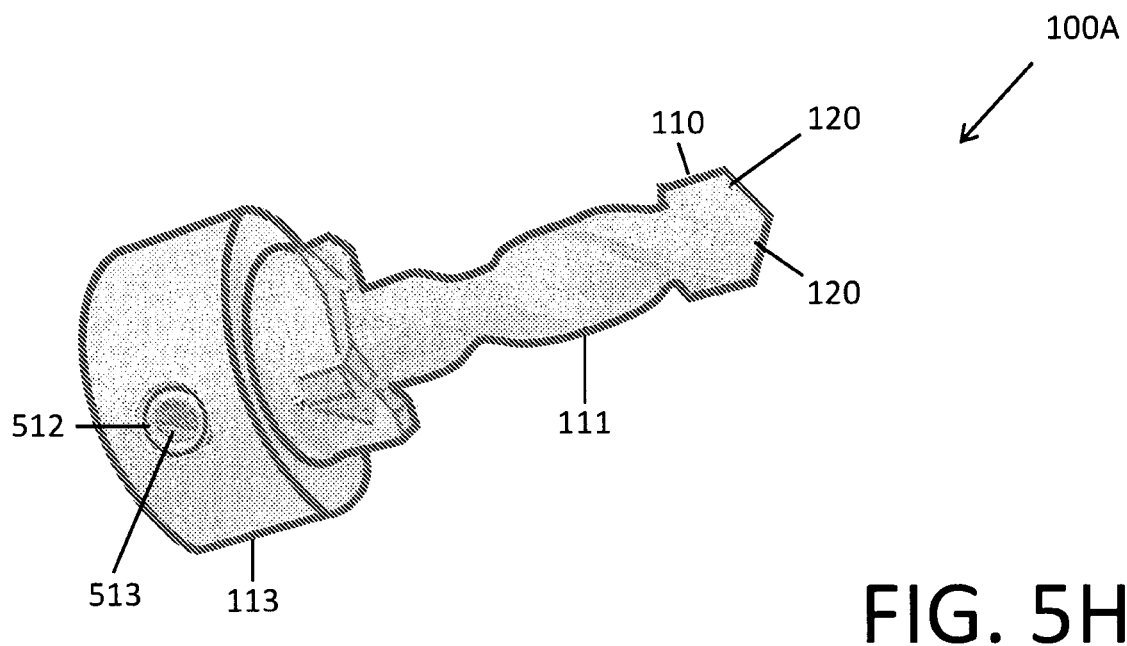
Figure 5I:
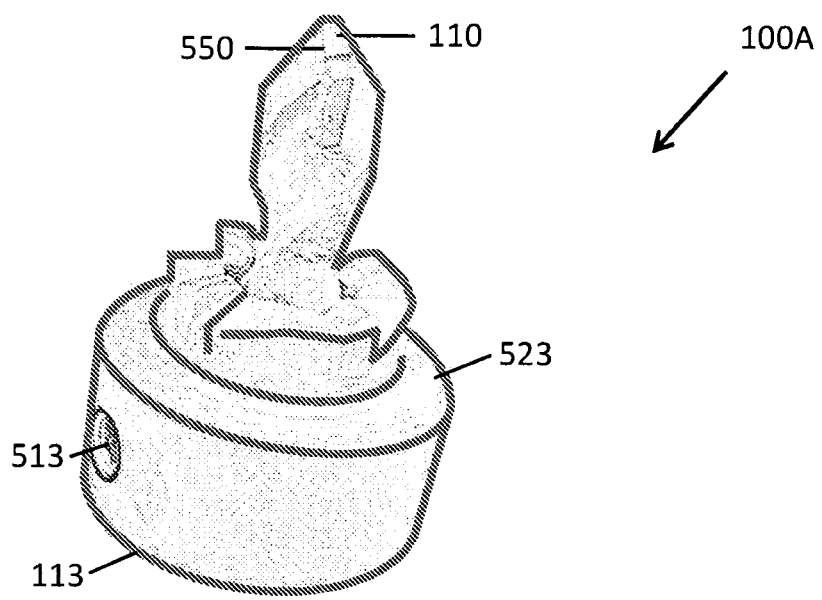
Figure 5J:
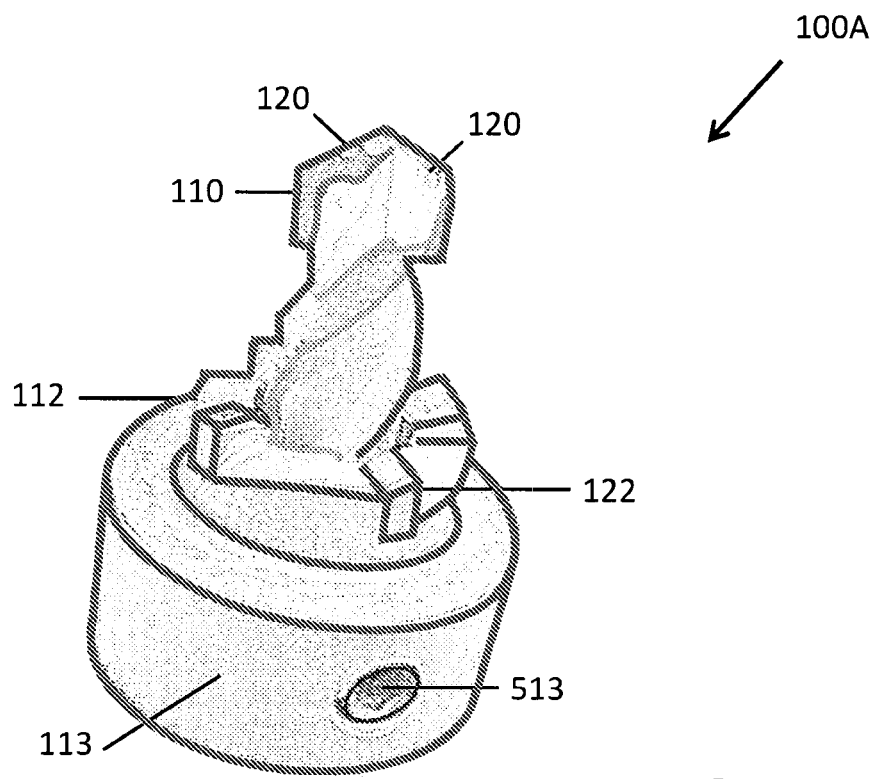

In FIG. 5G-5H, the stop collar 113 includes a stop surface 523. The diameter of each of the stop collar 113 and stop surface 523 is greater than the diameter of the counterbore cutter 112 and the counterbore hole it is to cut. The stop surface 523 rests up against the top surface of the material 499 of which the drill bit is to cut to avoid deeper drilling.

Figure 6A:
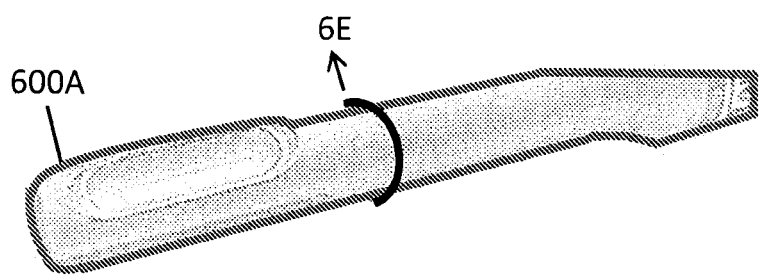
FIGS. 6A-6C are views of various different types of chuckable shanks of the counterbore drill bit with stop collar.
Figure 6D:
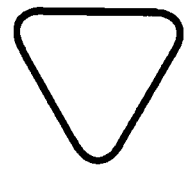
FIGS. 6D-6F are cross sectional views of various types of neck portions of the counterbore drill bit with stop collar.
Figure 6B:
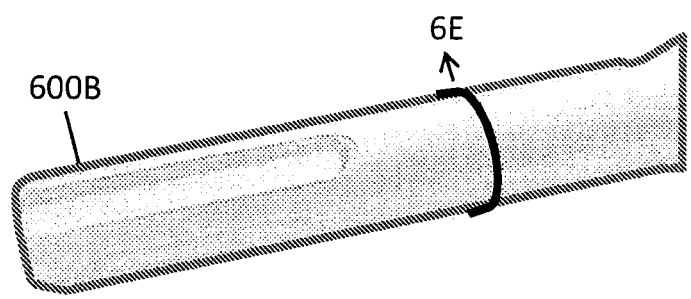
Figure 6E:
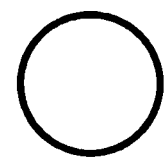
Figure 6C:
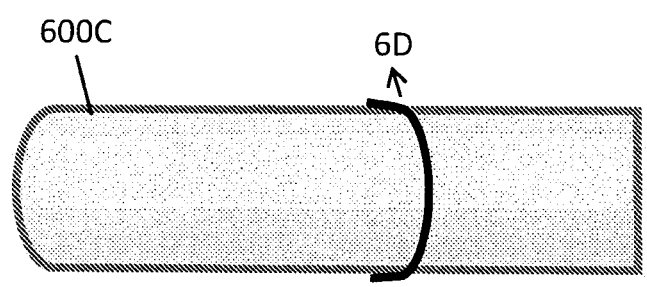

Referring now to FIG. 6A-6C, the shank of the counterbore drill bit can be installed into a variety of chucks of a hand held drilling machine or drill. Different types of shanks may be used for different types of chucks and drills to vary performance and function. A chuck and shank combination may provide better centering accuracy, for example. A hammer drill with a hammer chuck to receive a hammer drill shank can also provide a hammer action while twisting the drill, for example. Another type of chuck and shank may provide quick installation and release. A shank may be a brace shank, a straight shank, a hex shrank, a special direct system (SDS) shank, a 3-flat (triangle) shank, a spline drive shank, a morse taper shank, a square shank, or a threaded shank. The shank may neck down to a neck of the drill with a different cylindrical shape. That is, the cross section of the shank and the neck of a drill bit may differ.

The shank 114 of the drill bit 100A-100B may be a straight circular cylindrical shank. However other types of shanks may be used with the drill bits described herein. FIG.

Figure 6F:
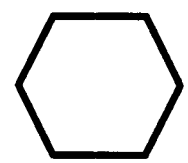

6A illustrates an SDS shank 600A. FIG. 6B illustrates a hammer shank 600B. FIG. 6C illustrates a triangular or 3-flat shank 600C. The selected shank may be mated to different types of necks. The neck may be a circular cylindrical neck with a circular or round cross section such as shown in FIG. 6E. The neck may be a continuation of the shape of the shank to lower costs of manufacture, such as a triangular or 3-flat neck extending from the triangular or 3-flat shank 600C shown in FIG. 6C. In which case, the neck and shank have a similar cross section such as shown in FIG. 6D. Another shank that can have a similar neck is a hex shank. With a drill bit having a hex neck and a hex shank they have the same hex cross section, such as shown in FIG. 6F.

Figure 7A:
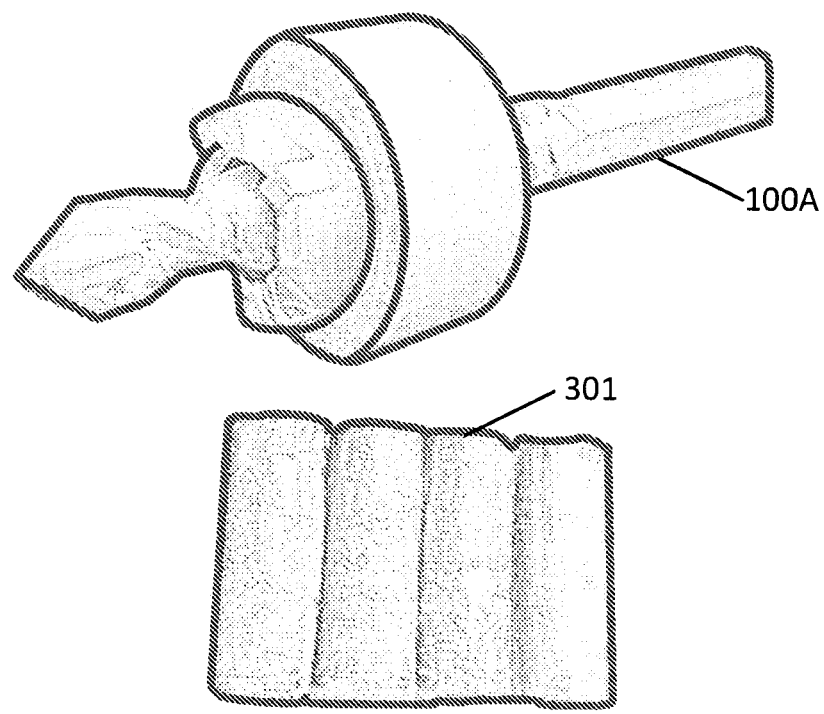
FIG. 7A illustrates a kit of a plurality of pre-cut lead rods and the counterbore drill bit with stop collar shown in FIGS. 5A-5J.

FIG. 7A illustrates a kit including the counterbore drill bit 100A with a plurality of pre-cut lead rods 301 having the same predetermined length L. The counterbore cutter 112 and the stop collar 113 are coupled together to form a counterbore hole of a predetermined depth from the top surface of the material. The counterbore cutter 112 and the stop collar 113 are coupled to the shaft 114 of the drill bit to set the depth of the first hole to a predetermined depth from the top surface of the material. The predetermined length of the plurality of pre-cut lead rods 301 is greater than the difference between the predetermined depths of the first hole and the counterbore hole from the top surface of the material. The predetermined length of the plurality of pre-cut lead rods 301 may range from one-sixteenth (1/16) of an inch to one and one half (1.5) inches in response to the depth of the hole.

Figure 7B:
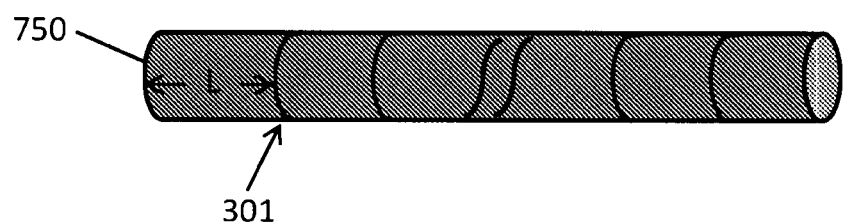
FIG. 7B illustrates a lead rod from which the plurality of pre-cut lead rods may be formed.

FIG. 7B illustrates a round bar stock (rod) of lead 750 of a predetermined diameter D to fit into the cylindrical hole 401, shown in FIG. 4A. The round bar stock of lead 750 is to be cut into the plurality of pre-cut lead rods 301 of length L, such as the plurality shown in FIG. 7A.

Embodiments with Adjustable Rotatable Stop Collar

While the embodiment of the counterbore drill bit 100A shown in FIGS. 5A-5J may be adjustable to adjust depths, its stop collar 113 rotates together with the shank 114 of the drill bit. The continuous rotation of the stop collar 113 can mar a surface that it makes contact with. Some surfaces into which survey markers are to be installed are expensive surfaces, such as marble for example. It would preferable that the stop collar 113 need not rotate together with the shank 114 of the drill bit to avoid marring surfaces.

Figure 8A:
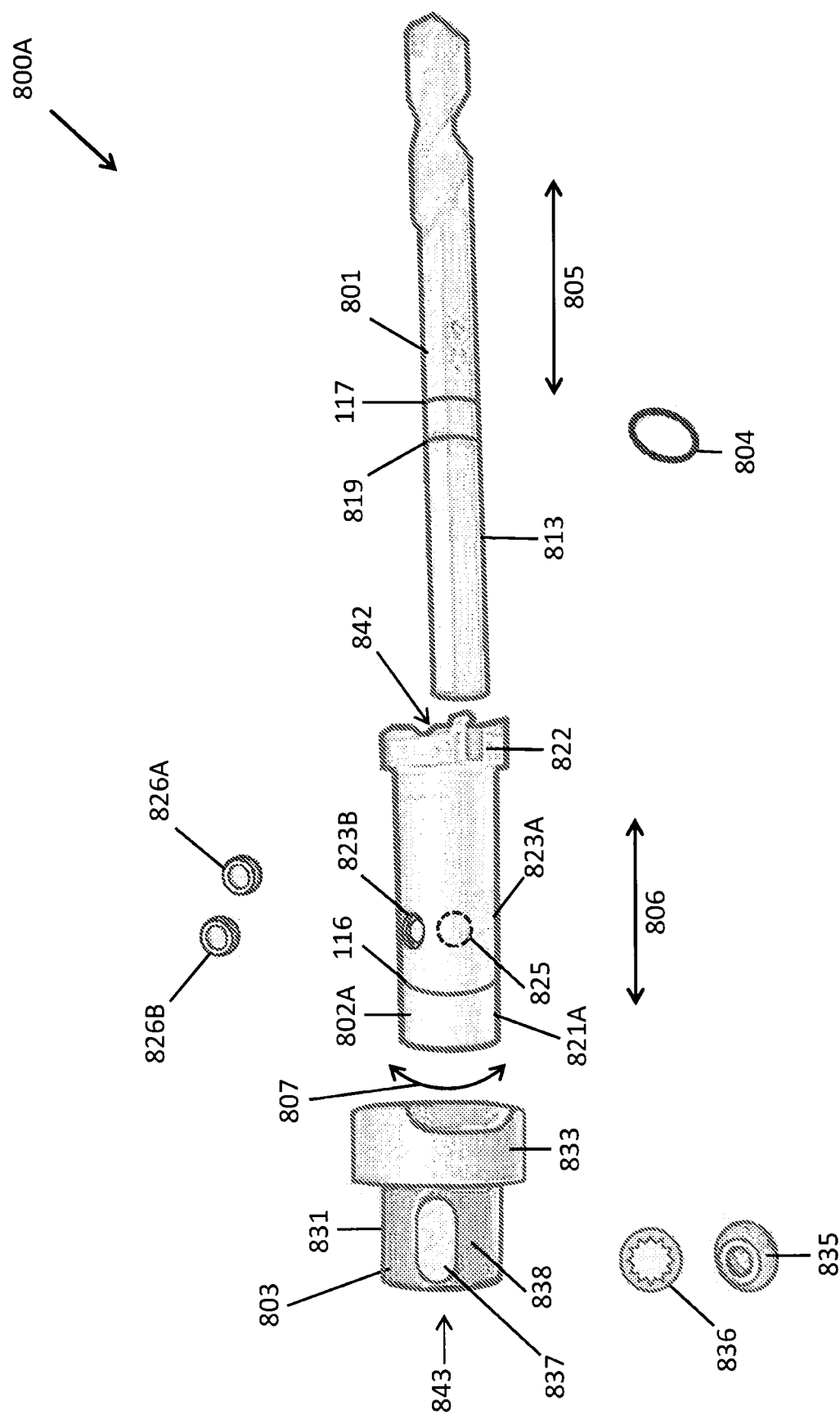
FIGS. 8A-8B are exploded views of embodiments of an adjustable counterbore drill bit tool.
Figure 8B:
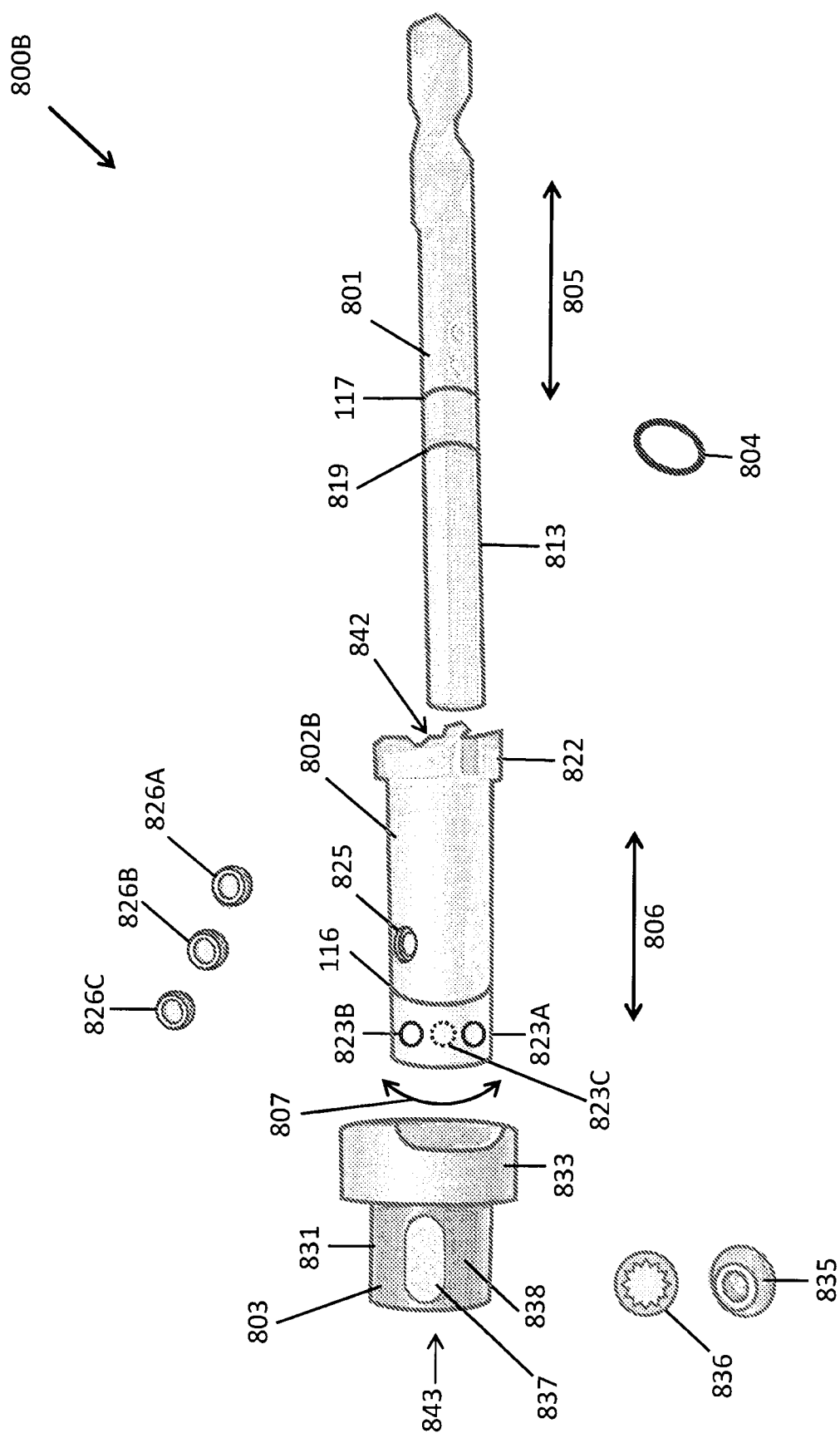

Referring now to FIGS. 8A-8B, embodiments of an adjustable counterbore drill bit tool 800A,800B (also referred to as a drill tap, and generally referred to herein with reference number 800) are shown having a stop collar that is not only adjustable, but also rotatable. Similar to the tool 100A shown in FIGS. 5A-5J, the adjustable counterbore drill bit tool 800A,800B can bore counterbore holes into masonry at variable depths to install survey tags. The adjustable counterbore drill bit tool 800A shown in FIG. 8A has a slightly different counterbore cutter 802A than the counterbore cutter 802B of the of the adjustable counterbore drill bit tool 800B shown in FIG. 8B. However, the counterbore cutter 802A and the counterbore cutter 802B function similarly and may be collectively referred to herein with the same reference number as in the counterbore cutter 802.

The adjustable counterbore drill bit tool 800 includes a drill bit 801, the counterbore cutter 802, a rotatable adjustable stop collar 803, and a retaining split ring 804. The counterbore cutter 802, a circular cutting tool, is selectively and adjustably coupled to the drill bit 801. The rotatable adjustable stop collar 803 is selectively and adjustably coupled to the counterbore cutter 802.

When assembled together, the counterbore cutter 802 is selectively adjustable along the neck of the drill bit 801 as indicated by arrowhead 805. When assembled, the stop collar 803 is selectively adjustable along the shaft 821 of the counterbore cutter 802 as indicated by arrowhead 806. When assembled, a collar 833 of the rotatable adjustable stop collar 803 is rotatable about the counterbore cutter 802 and the drill bit 801 as indicated by arrowhead 807. Conversely, the counterbore cutter 802 and drill bit 801 rotate together with reference to the collar 833 of the rotatable adjustable stop collar 803.

The counterbore cutter 802 may include one or more rings or lines 116 cut into, painted, or marked onto the hollow shaft 821A,821B at certain points. These one or more rings or lines 116 indicate the positions at which the rotatable adjustable stop collar 803 may be set for the cutting head of the counterbore cutter to cut at one or more predetermined counterbore depths. The drill bit 801 may include one or more rings or lines 117 cut into, painted, or marked onto its shaft. The one or more rings or lines 117 may indicate the positions at which the counterbore cutter 112 is set to begin cutting at one or more predetermined depths of the drill bit. At least one of the one or more rings or lines 117 may be set to drill to match a length of the predetermined lead rod 301. One of the one or more rings or lines 117 may be cut sufficiently deep around the shaft of the drill bit to receive the retaining or retention split ring 804. These lines 117 capable of receiving the retaining or retention split ring 804 may be referred to as one or more aligned groove segments 819.

The retaining or retention split ring 804 can couple to the shaft (neck, shank) of the drill bit 801 at one or more points (e.g., circumferences or cross section points) along the length of the shaft of the drill bit 801. At each of these points, one or more groove segments 819 in alignment are cut around a circumference of the shaft of the drill bit 801. The retaining split ring 804 in the one or more groove segments 819 keeps the counterbore cutter 802 from sliding off the back end of the drill bit. The flutes in the drill bit and the cutting tip coupled to the drill bit, keep the counterbore cutter 802 from sliding off the front or tip end of the drill bit 801. For example, the retaining split ring 804 can couple into one or more groove segments 819 on the shaft of the drill bit at a first point to retain the counterbore cutter 802 along a length of the drill bit 801. Additional one or more groove segments 819 may be provided at different points around the shaft of the drill bit so that further adjustment of the counterbore cutter 802 and stop collar 803 over the drill bit 801 can be made to change hole depths. With a circular shaft, the one or more groove segments at a point merge together into a circular groove around the circumference of the shaft.

The drill bit 801 has at least one diameter to drill at least one hole of one diameter to a first depth. The counterbore cutter 802 has a second diameter to drill a larger diameter hole, around and concentric with the one or more holes drilled by the drill bit 801. With the stop collar 803 acting as a stop against a surface, the counterbore cutter 802 drills to a depth less than depths of holes drilled or cut out by the drill bit 801.

The drill bit 801 has a slot 811 near a tip end, a pair of twisted cutting edges (flutes) 812 extending a first length along an axis from the tip end, and a solid shaft 813 comprising a neck 814 and a shank 815 extending a second length along the axis from an end of the pair of twisted cutting edges 812. The shaft 813 has one or more first groove segments 819 in alignment at a first point around the shaft.

The shank 815 may be one of the various types of shanks described herein, such as triangular or circular in cross section, so that the drill can be chucked into a power drill. The neck 814 may be triangular or circular in cross section to match that of the shank. In other cases, such as an SDS shank, the neck will be triangular or circular in cross section and differ from the cross section of the shank.

The counterbore cutter (circular cutting tool) 802 is hollow with a center cylindrical channel opening 842 along its center lengthwise axis so that it can be adjustably coupled to the drill bit 801. The diameter of the center cylindrical channel opening 842 is slightly greater than the diameter of the solid shaft 813 of the drill bit 801. Accordingly, the counterbore cutter 802 can slide over and along the solid shaft 813 of the drill bit 801 to adjust a cutting depth of the drill bit 801 before the cutting head of the counterbore cutter 802 starts cutting.

The drill bit 801 forms a first hole of the first diameter to receive the lead shot. The counterbore cutter 802 has a hollow shaft 821 and a cutting head 822 coupled to an end of the hollow shaft 821. The cutting head 822 includes with a plurality of cutting teeth 122 space apart around the cutting head. The cutting head 822 of the counterbore cutter 802 forms a second (tag) hole with a larger diameter than that of the first (lead) hole. The second hole is drilled shallower than the first hole. The diameter of the second hole is sufficient to receive a tag or other monument.

The hollow shaft 821 of the counterbore cutter has a plurality of threaded holes 823A-823B to respectively receive a plurality of fasteners (set screws) 826A-826B to couple the counterbore cutter 802 to the drill bit 801. When sufficiently screwed in the threaded holes, the end of the shaft of the fasteners 826A-826B engage the shaft of the drill bit. The hollow shaft 821 further has at least one threaded hole 825 to respectively receive the threaded shaft of a fastener (hex head screw) 835 to couple the stop color 803 to the counterbore cutter 802. When sufficiently screwed in the threaded hole 825, the head of the faster 835 engages an outer surface (directly or through an optional star washer) of the hollow shaft of the stop collar.

In FIG. 8A, the plurality of threaded holes 823A-823B and the at least one threaded hole 825 are aligned together around the center axis in a circumference of the hollow shaft 821A of the counterbore cutter 802A. With three fasteners aligned together, they may be spaced apart by one-hundred twenty degrees from each other. This one-hundred twenty degree spacing can align the fasteners in the holes with flat portions of a neck formed by a semi-triangular cross section (e.g., see FIGS. 6C-6D) of a triangular shank.

In FIG. 8B, counterbore cutter (circular cutting tool) 802B includes a plurality of threaded holes 823A-823C and the at least one threaded hole 825. The plurality of threaded holes 823A-823C are not aligned with the at least one threaded hole 825 around an axis and circumference of the hollow shaft 821B of the counterbore cutter 802A. The plurality of threaded holes 823A-823C are spaced apart from the at least one threaded hole 825 along the length of the hollow shaft 821B. Accordingly, the plurality of threaded holes 823A-823C in the hollow shaft 821B fall outside the range of adjustments in the rotatable adjustable stop collar 803 so they are readily accessible. To accommodate the spacing between the plurality of threaded holes 823A-823C and the at least one threaded hole 825, the hollow shaft 821B may be longer than the hollow shaft 821A.

The plurality of threaded holes 823A-823C are aligned together around a circumference of the hollow shaft, but spaced apart by one-hundred twenty degrees about an axis and the circumference. Along a length axis, at least one threaded hole 825 may be angled one-hundred twenty degrees from each of the threaded holes 823A-823B and aligned with an optional threaded hole 823C. A plurality of threaded fasteners 826A-826C are threaded into the plurality of threaded holes 823A823C, engaging the shaft of the drill bit, to selectively couple the counterbore cutter 802 to the solid shaft of the drill bit 801. In the case of a triangle shaft with three flats, the hollow shaft may be rotated along the length axis to align the plurality of threaded holes 823A-823C onto two or three flats so that the plurality of threaded fasteners 826A-826C engage at least two flats, if not three flats, of the triangle shaft.

The rotatable adjustable stop collar 803 is adjustably coupled to the counterbore cutter 802. The rotatable adjustable stop collar 803 is hollow, having a center cylindrical channel 843 along its center lengthwise axis. The diameter of the center cylindrical channel 843 is a slightly larger than the diameter of the hollow shaft of the counterbore cutter. Thus, the rotatable adjustable stop collar 803 slides over onto the hollow shaft 821A,821B of the counterbore cutter 802A,802B. The rotatable adjustable stop collar 803 is selectively and slideably adjustable along a portion of the hollow shaft 821A,821B to adjust a cutting depth of the counterbore cutter 802A,802B. As explained herein, the rotatable adjustable stop collar 803 is adjusted to drill holes with depths so that a survey tag sits below a surface into which the holes are drilled.

The hollow rotatable shaft 831 of the rotatable adjustable stop collar 803 has at least one oval through hole slot 837 to receive the fastener 835. Surrounding at least one of the at least one oval through hole slots 837 is a flat surface 838 in the outer surface of the hollow rotatable shaft 831. The flat surface 838 of the hollow rotatable shaft 831 is used to engage the head of the fastener 835 and an optional star washer 836.

The fastener 835 has a head and a threaded shaft coupled to the head. The threaded shaft of the fastener 835 is inserted into (the optional star washer and) the through hole slot 837, and the threaded hole 825. The optional star washer 836 may be used between the head of the fastener and the flattened surface 838 to better hold the head of the fastener 835 engaged with the hollow shaft of the counterbore cutter. With the fastener 835 in the through hole slot 837 and threaded into the threaded hole 825, but not engaged with the surface 838 or washer there-between, the rotatable adjustable stop collar 803 can slide back and forth under the head of the fastener 835. The range the rotatable adjustable stop collar 803 can slide back and forth is about equal to the length of the through hole slot 837 less the diameter of the shaft of the fastener 835. The fastener 835 in the through hole slot 837 and threaded into the threaded hole 825 retains the rotatable adjustable stop collar 803 engaged with the counterbore cutter 802.

The threaded fastener 835 includes threads that engage threads of the hole 825. Accordingly, when the threaded fastener 835 is rotated within the hole, the head of the fastener is tighten up against the flat surface 838 of the hollow rotatable shaft 831 and or the washer. In this manner, the hollow rotatable shaft 831 of the rotatable adjustable stop collar 803 is coupled to the shaft 821 of the counterbore cutter 802 at the selected position along the shaft 821 to set the counterbore hole depth as well as a portion of the depth of the hole formed by the drill bit 801.

The shaft (or neck) of the drill bit 801 includes one or more aligned groove segments 819 at one or more points (see segments 819B-819C shown in FIGS. 10A-10B for example) around the shaft of the drill bit. With a circular shaft, the one or more aligned groove segments 819 form a circular groove. With a triangular shaft, the one or more aligned groove segments are three aligned groove segments spaced apart in circular segments of the triangular shaft.

The retaining split ring 804 can couple into different one or more aligned groove segments 819 at various points along the shaft (or neck) of the drill bit for different depths. When the retaining split ring 804 is coupled into one of the one or more first groove segments 819 at a point and the fastener 835 is in the through hole slot 837 and threaded into the threaded hole 825, the retaining split ring 804 and the fastener 835 retain the counterbore tool 802 and the rotatable adjustable stop collar 803 together on the shaft of the drill bit 801. The center lengthwise axis of each center cylindrical opening of the counterbore tool 802 and the rotatable adjustable stop collar 803 are aligned and concentric with the center lengthwise axis of the shaft of the drill bit 801.

Figure 9A:
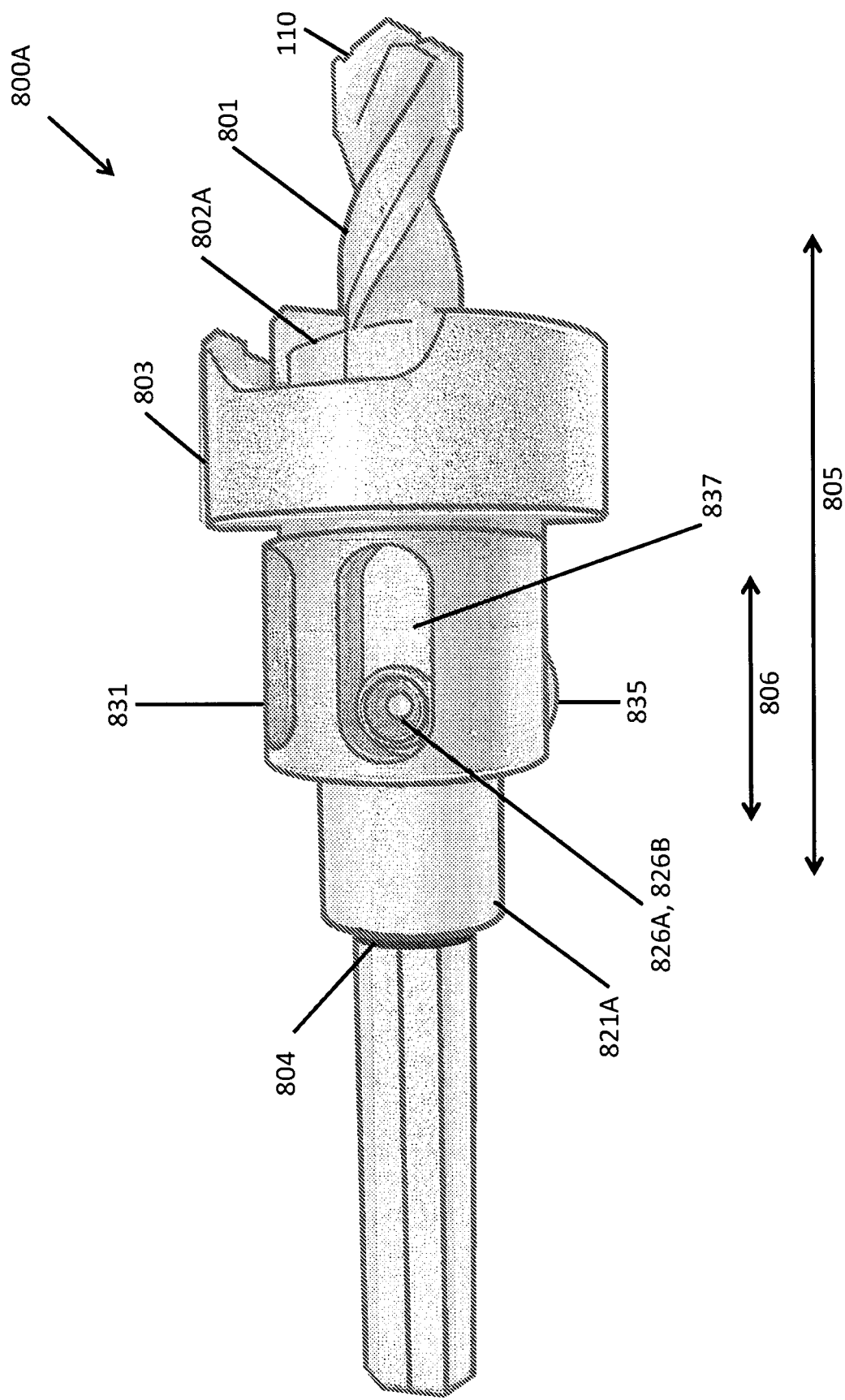
FIGS. 9A-9C are assembled views of the embodiment of the adjustable counterbore drill bit tool shown in FIG. 8A.
Figure 9B:
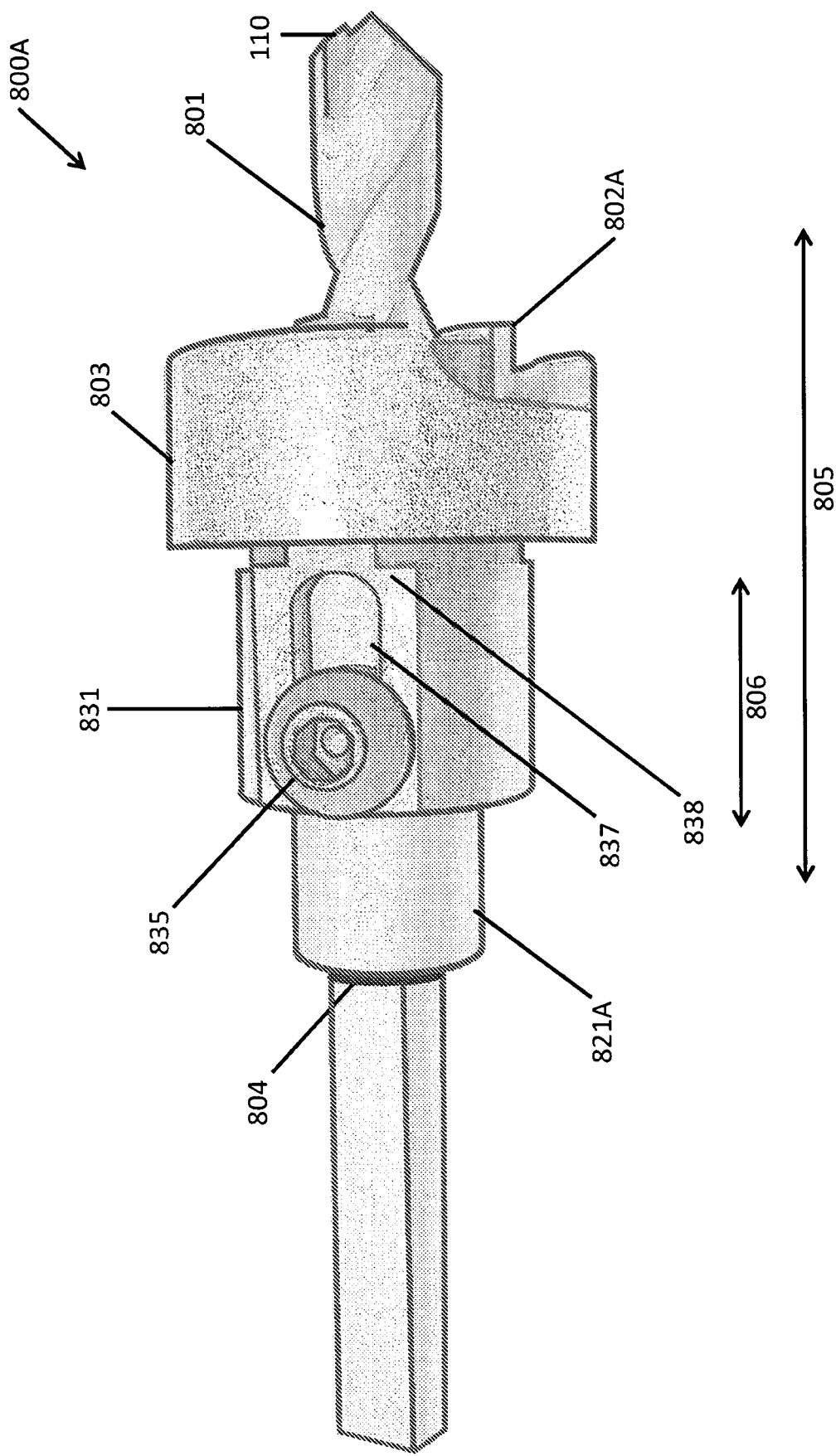
Figure 9C:
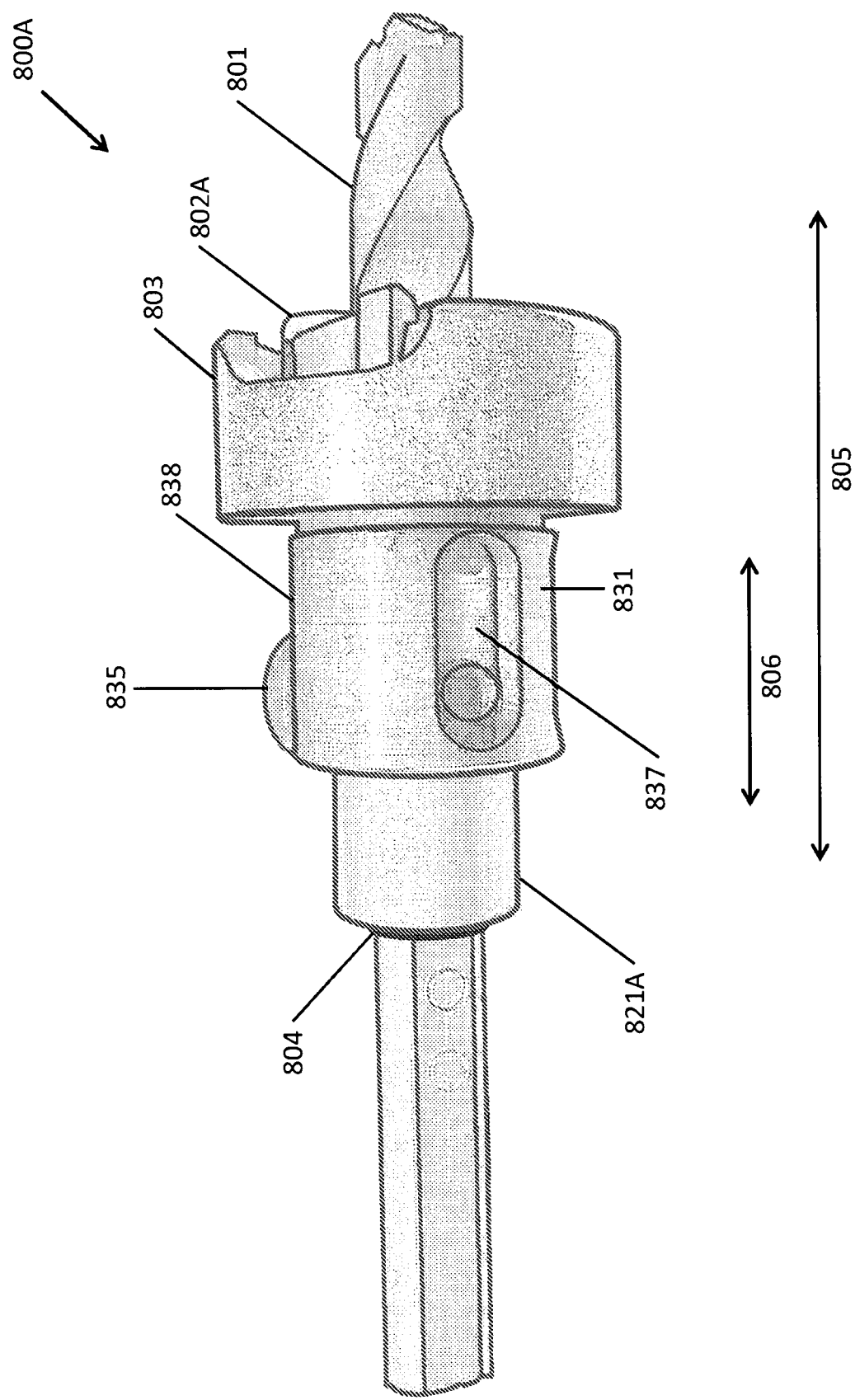

Referring now to FIGS. 9A-9C, assembled side views of the adjustable counterbore drill bit tool 800A are shown rotated to different angles (approximately 120 degrees) in each view. FIG. 9A illustrates one of the one or more set screws 826A,826B within through one oval opening 837 in the shaft 831 of the rotatable stop collar 803. FIG. 9C illustrates another one of the one or more set screws 826A, 826B within another oval opening 837 in the shaft 831 of the rotatable stop collar 803. With all of the one of the one or more set screws 826A,826B loose, disengaged from the shaft of the drill bit, the counterbore cutter 802A is adjustable along the shaft of the drill bit 801 as indicated by the double arrowhead 806. The range of motion of the counterbore cutter 802A is limited at one end by the position of the retaining split ring 804 along the shaft the drill bit 801 and the carbide blade of the drill bit tip 110 at the opposite end. The range can be made larger by movement of the retaining split ring 804 back along the shaft to another one or more groove segments towards the end of the shank. The range can be made smaller by movement of the retaining split ring 804 forward along the shaft to another one or more groove segments towards the drill bit tip.

FIG. 9B illustrates the fastener 835 with its shaft extending through another oval opening 837 in the shaft 831 of the rotatable stop collar 803. FIG. 9B further illustrates the flat surface 838 in the shaft 831 around the oval opening 837 to better engage the head of the fastener 835. With the fastener 835 loose, disengaged from the flat surface 838, the rotatable stop collar 803 is adjustable along the shaft 821A of the counterbore cutter 802A as indicated by the double arrowhead 806. The length of the oval opening 837 limits the range of adjustment of the rotatable stop collar 803 along the shaft 821A of the counterbore cutter 802A.

Figure 10A:
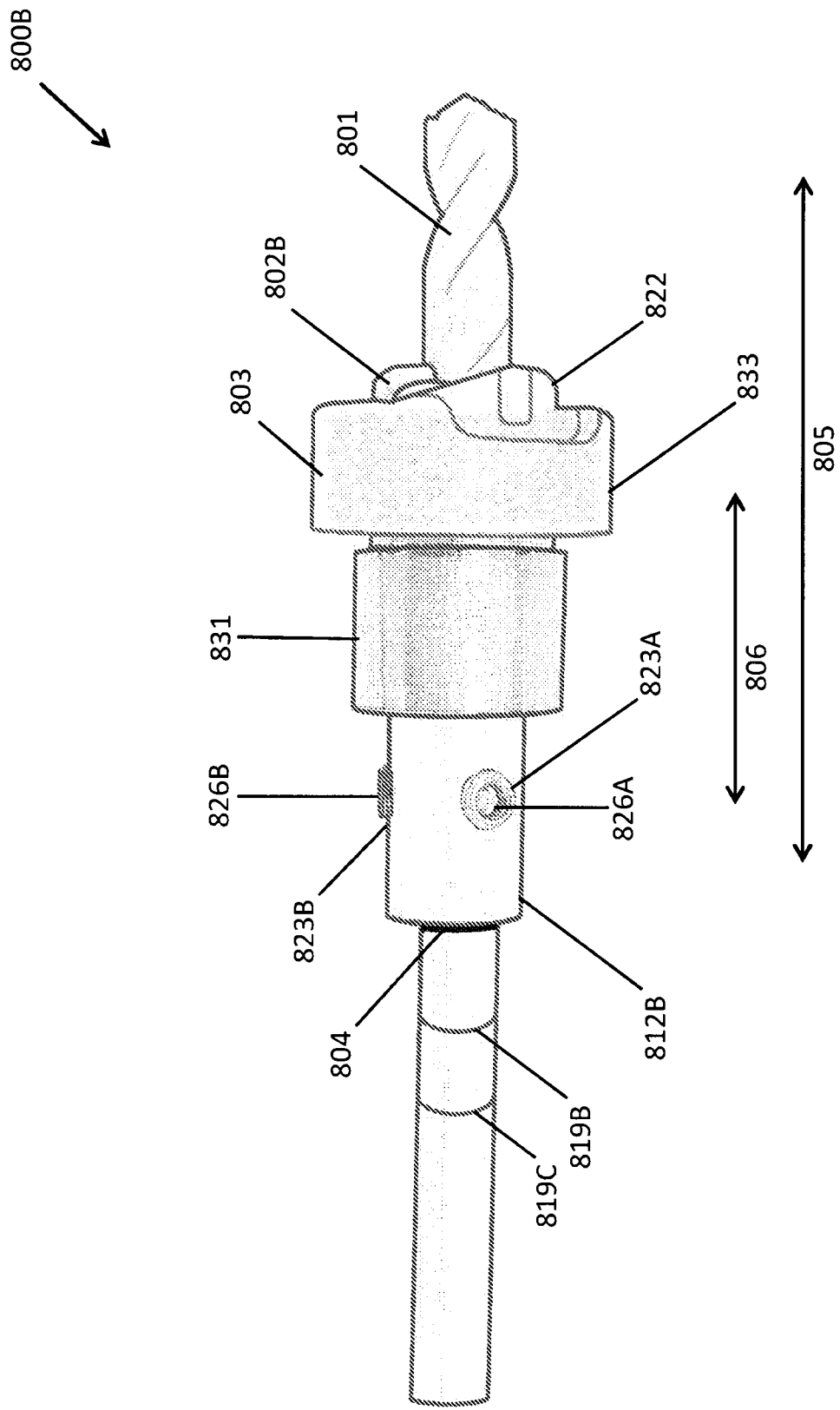
FIGS. 10A-10C are assembled views of the embodiment of the adjustable counterbore drill bit tool shown in FIG. 8B.
Figure 10B:
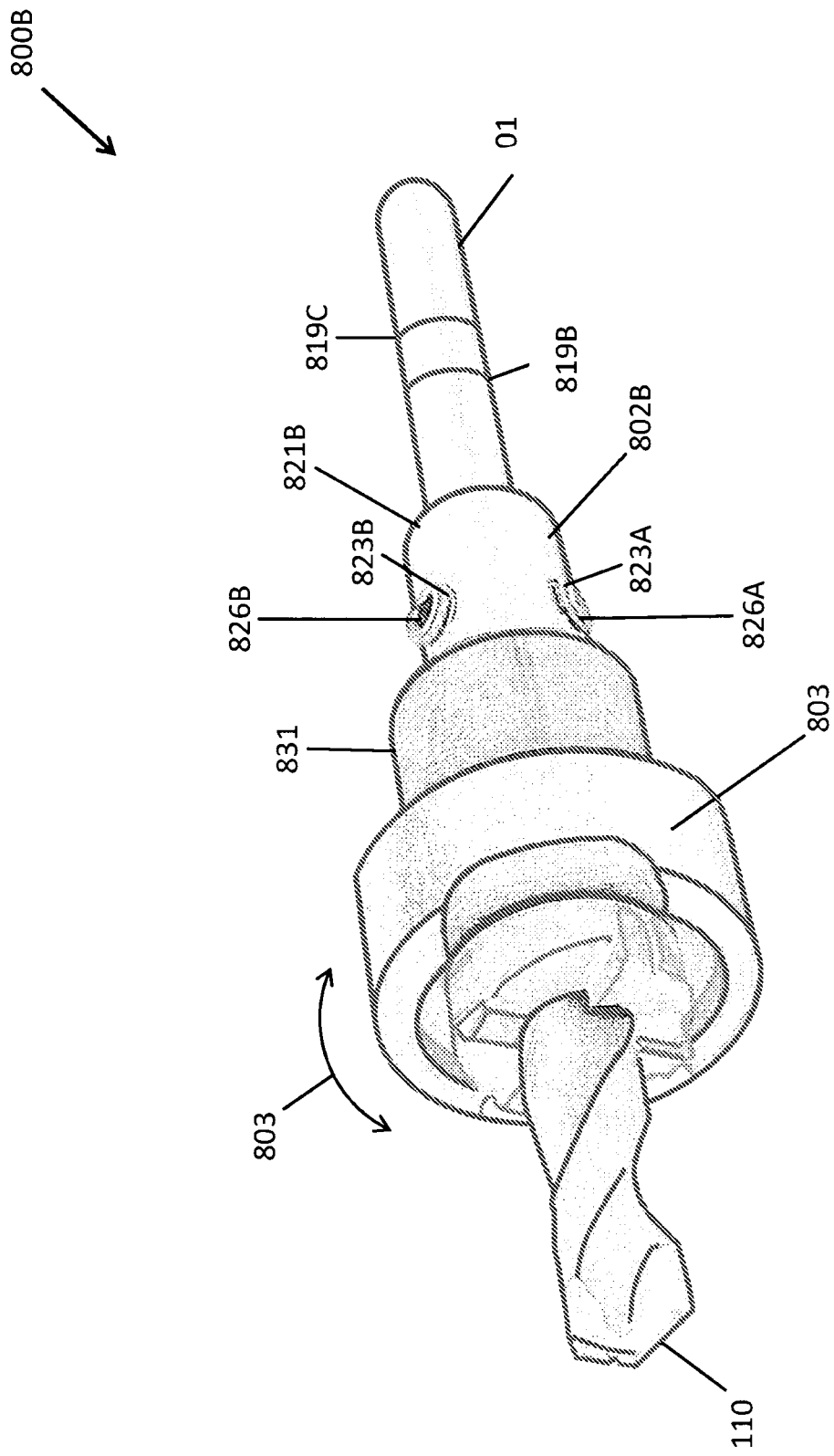
Figure 10C:
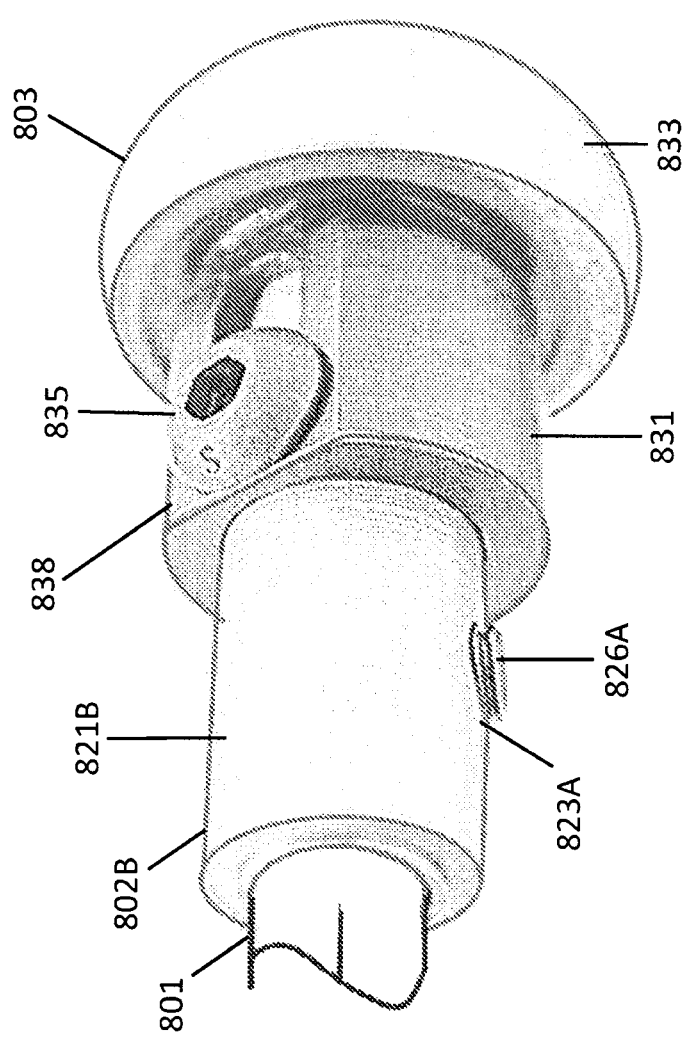

Referring now to FIGS. 10A-10C, assembled views of the adjustable counterbore drill bit tool 800B are shown. The one or more set screws 826A-826C are threaded into holes 823A-823C in the shaft 821B of the counterbore cutter 802B away from the rotatable stop collar 803. Accordingly, the one or more set screws 826A-826C are more accessible to tighten by avoiding being located under the stop collar 803. The one or more set screws 826A-826C engage the shaft of the drill bit 801 to selectively couple the counterbore cutter 802B to the drill bit.

FIG. 10A illustrates the retaining split ring 804 coupled to the shaft of the drill bit 801. The ring 804 is engaged within a plurality of aligned groove segments 819 at a first point around the circumference of the shaft of the drill bit 801. Additional sets of a plurality of aligned groove segments 819B-819C may be located at other points around the circumference of the shaft of the drill bit 801 so that different depths of holes may be set from that of the first point.

As shown in FIGS. 10A-10C, the adjustable rotatable stop collar 803 may have fewer oval openings 837 in its shaft 831 because the one or more set screws 826A-826C are positioned along the shaft 821B outside the rotatable stop collar 803. Only one oval opening 837 is required in the shaft 831 of the stop collar 803 so the threaded shaft of the fastener 835 can protrude through and engaged the threaded hole 825 in the shaft 821B of the counterbore cutter 802B as is shown in FIG. 8B.

FIG. 10C illustrates how the head of the fastener 835 can tighten up against the flat portion 838 in the shaft 831 around the oval opening 837. Optional, a star washer 836 may be used between the flat portion 838 and the head of the fastener 835 so the fastener has less of a tendency to unscrew on its own.

Figure 11A:
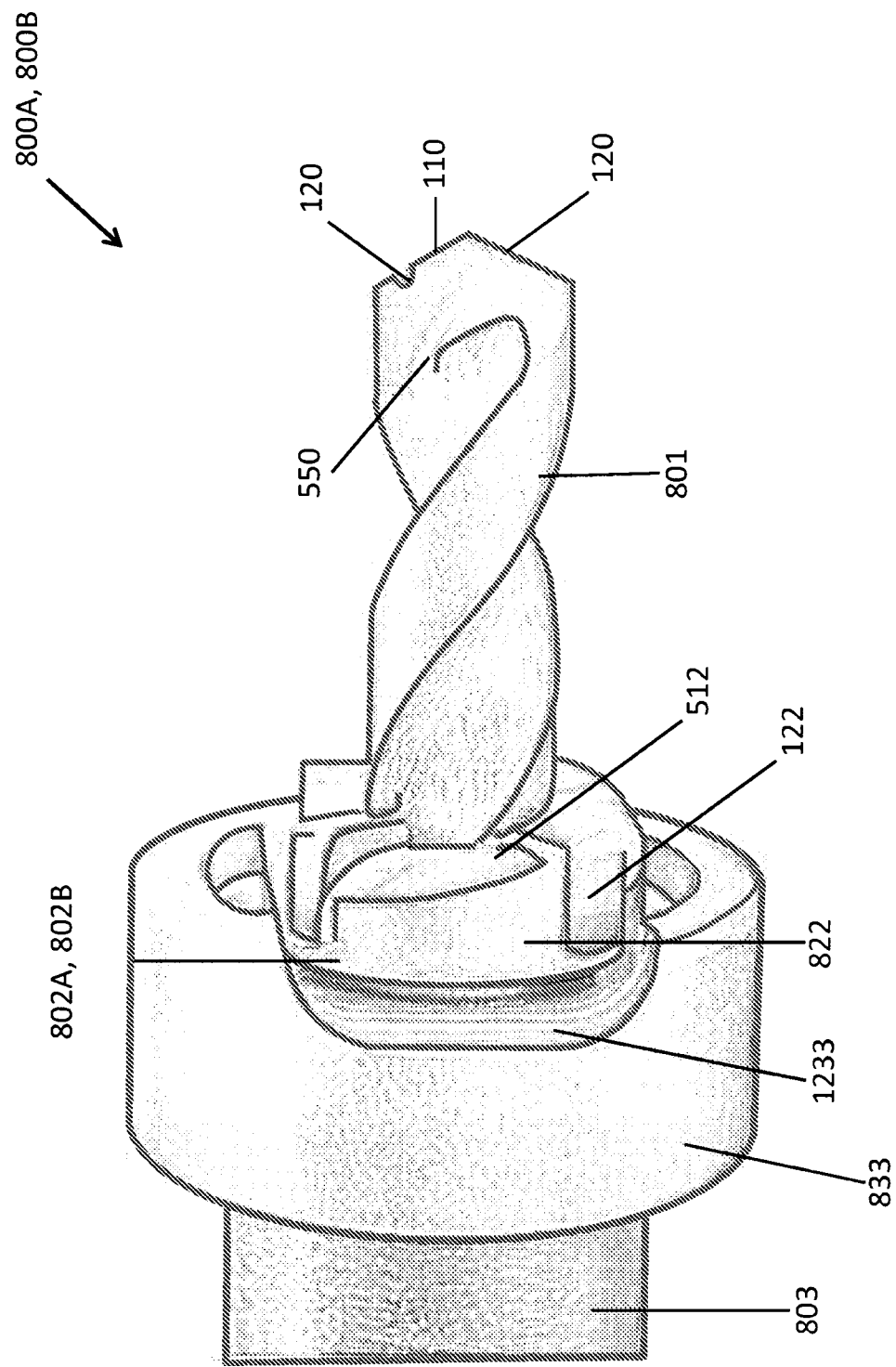
FIGS. 11A-11B are magnified perspective views of a front portion of the counterbore drill bit tool shown in FIGS. 8A-8B.
Figure 11B:
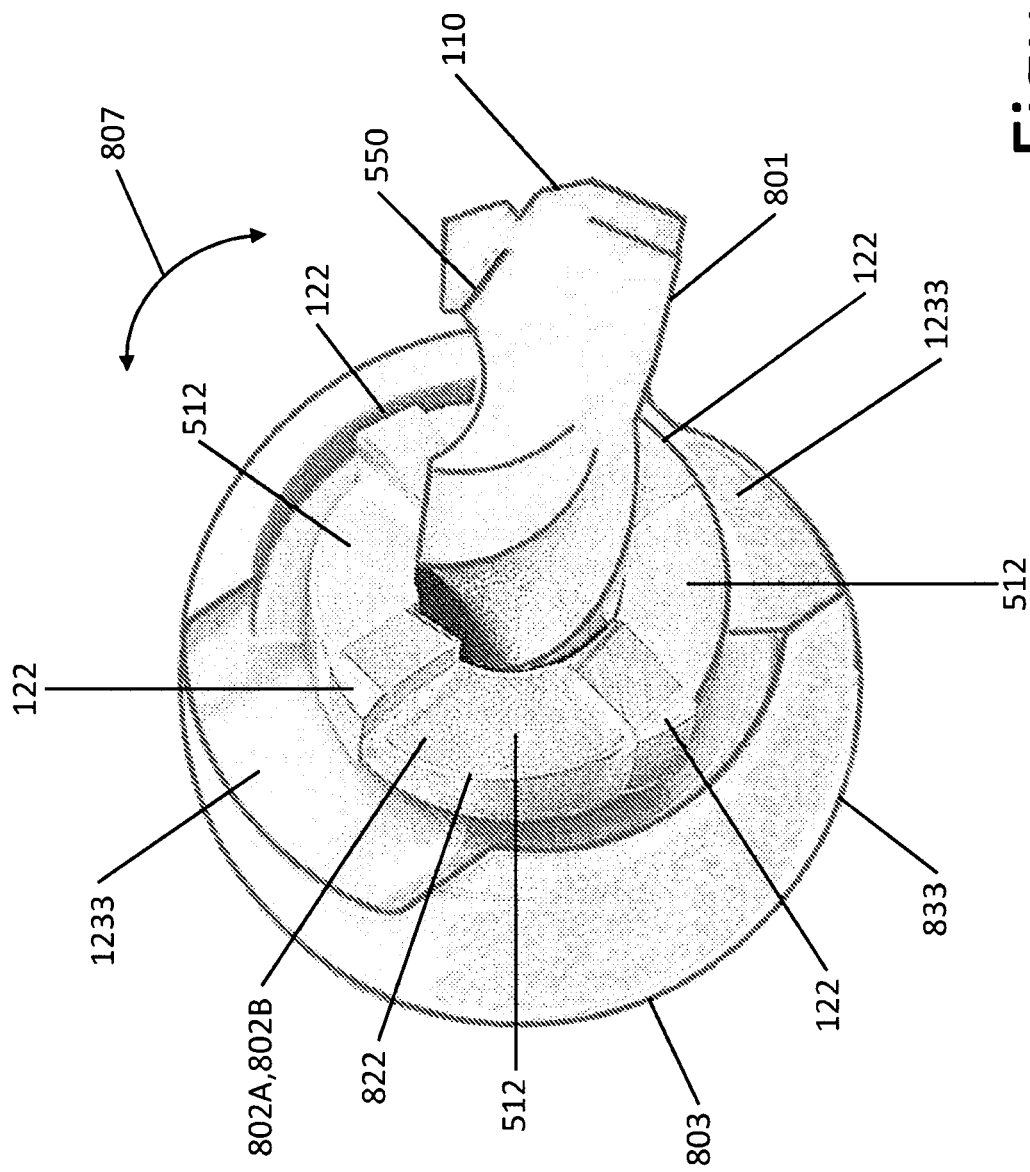

Referring now to FIGS. 11A-11B and 10B, a description of the ring shaped cutting head 822 of the counterbore cutter 802A,802B is now described with that of the drill bit 801. The cutting head 822 includes with a plurality of cutting teeth 122 spaced apart around the cutting head. The plurality of cutting teeth 122 are cuboid tungsten carbide blades brazed to a high speed steel alloy base of the cutting head. Ramps 522 are cut into the base of the cutting head from one tooth 122 leading down to the next tooth 122. The ramps 522 in the cutting head allow the cut material to be ejected up and outward towards the stop collar 803. U-shaped openings 1233 in the rotating stop collar 803 allow the cut material to be exhausted out from the adjustable counterbore drill bit tool 800A,800B.

While the plurality of cutting teeth 122 are disclosed as being cuboid, they may by trapezoidal prims in shape to cut countersink holes instead of counterbore holes. Alternatively, the cuboid cutting teeth may be mounted to the base of the cutting head 822 on a slant to cut countersink holes instead of counterbore holes.

The drill bit 801 is somewhat similar to that of the drill bits described herein. The drill bit 801 is a durable non-water high speed masonry drill bit to cut through masonry, such as concrete. The drill bit 801 includes a tungsten carbide drill bit tip 110, a twisted drill cutting shaft portion (body or flute portion) 111, a neck portion 115, and a chuckable shank portion 114.

The carbide drill bit tip 110 is a flat A-frame-shaped (or inverted V-shaped) blade. The A-frame-shaped blade of carbide drill bit tip 110 has opposing cutting edges. The carbide drill bit tip 110 may include one or more pairs of opposing notched V-shaped grooves 120 in each cutting edge. The one or more v-shaped grooves 120 have an increasing depth. The v-shaped groove 120 increases in depth from a front side edge to a back side edge of the cutting blade. The opposing notched V-shaped grooves 120 in each cutting edge keep the drill centered at a point and avoid walking or runout away from a desired drill point. The notched grooves 120 may have a V-shape to form V-shaped grooves.

The diameter W1 of the twisted drill cutting shaft portion 111 can vary from one-eight inch, three-eights inch, one half inch, three-fourths inch, one inch, or more. The chuckable shank portion 114 may have similar diameters to be received by various drill tools. In other embodiments, the diameters of the twisted drill cutting shaft portion 111, the neck portion 115, and the chuckable shank portion 114 may differ.

Near the tip of the twisted drill cutting shaft portion 111, a slot 550 is cut therein to receive the tungsten carbide drill bit tip 110. Within the slot 550, the blade of the carbide drill bit tip 110 is brazed to the twisted drill cutting shaft portion 111 with a braze alloy. The twisted drill cutting shaft portion 111 is formed of a high speed steel alloy, for example. The tungsten carbide drill bit tip 110, a blade, is formed out of tungsten carbide, for example.

Figure 12A:
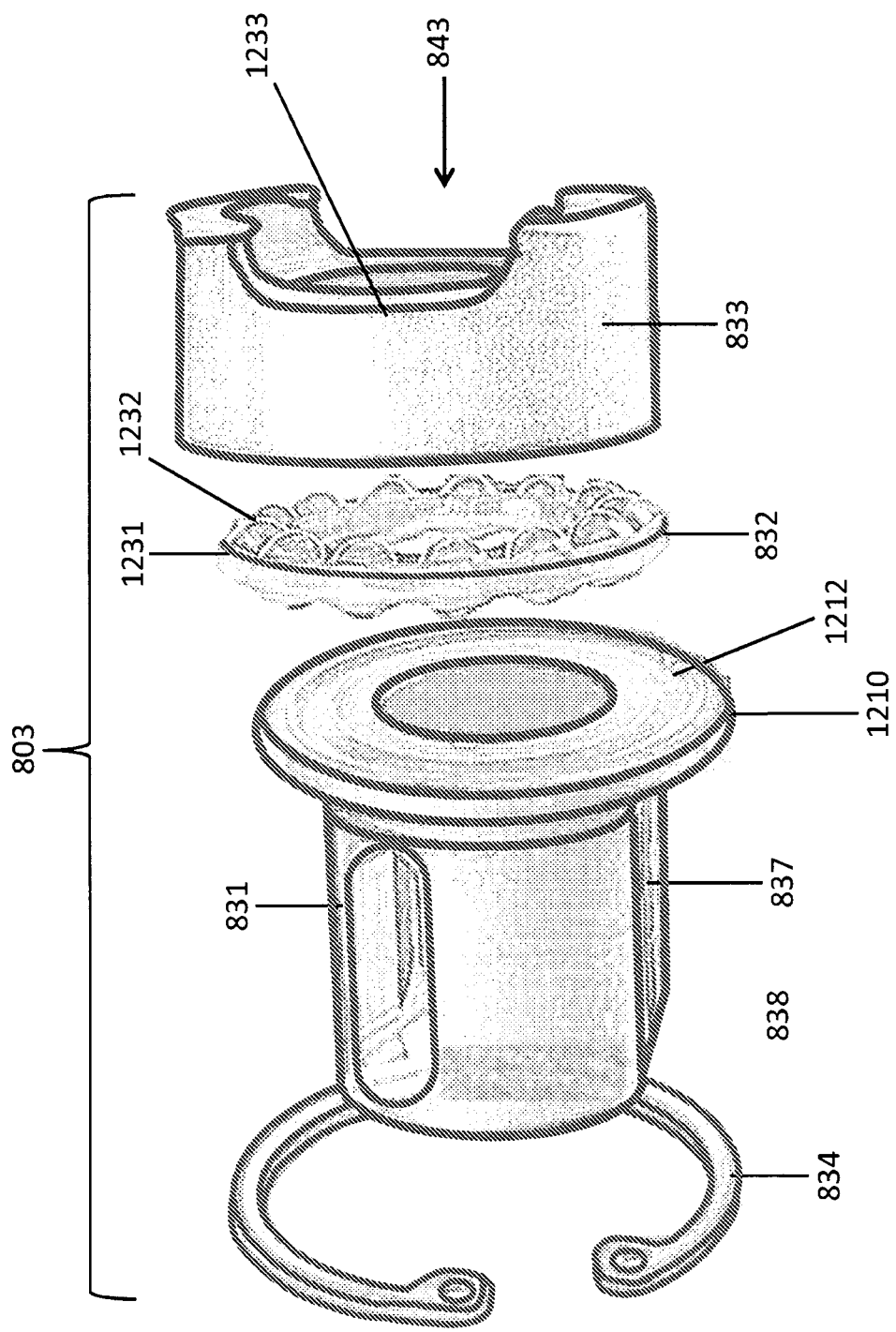
FIGS. 12A-12B are exploded side views of the adjustable rotatable stop collar.
Figure 12B:
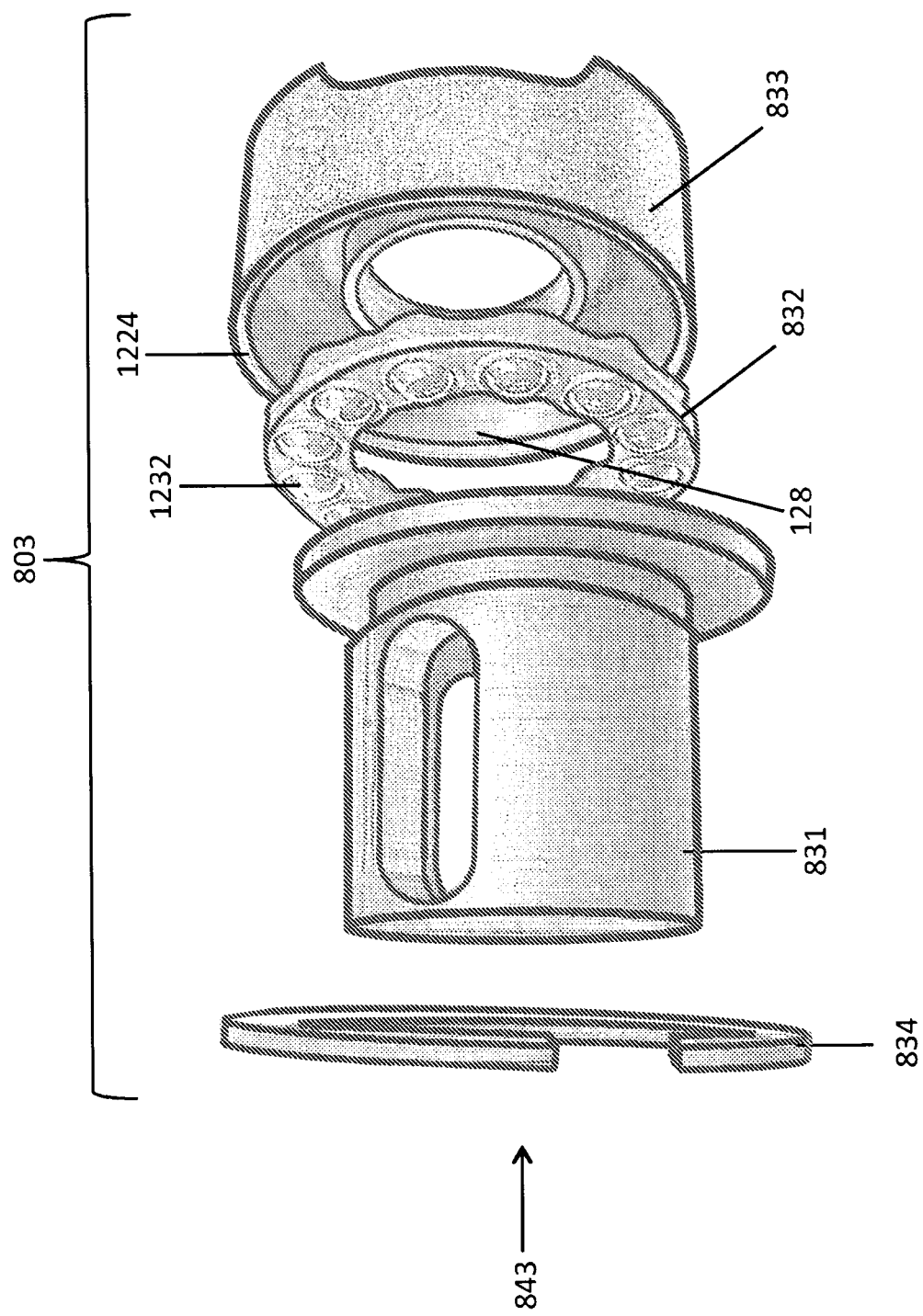

Referring now to FIGS. 12A-12B, the components of the rotatable adjustable stop collar 803 are exploded. When assembled together, the rotatable adjustable stop collar 803 is adjustably coupled to the counterbore cutter 802. The rotatable adjustable stop collar 803 has a hollow rotatable shaft 831, a ring thrust bearing 832, and a collar 833 rotatably coupled together by a snap ring 834. The snap ring 834 couples to the collar 833. The hollow rotatable shaft 831 has at least one oval through hole slot 837 to receive the fastener 835. Surrounding at least one of the at least one oval through hole slots 837 is a flat surface 838 in the outer surface of the hollow rotatable shaft 831. The flat surface 838 of the hollow rotatable shaft 831 is used to engage the head of the fastener 835 and an optional star washer 836.

In FIG. 12A, the ring thrust bearing 832 includes a plurality of ball bearings 1232 in a ring shaped bearing race 1231. The hollow rotatable shaft 831 includes a flange 1210 with a circular track recess 1212 around which the ball bearings 1232 roll. The collar 833 includes a pair of opposing U shaped vent openings 1233 in opposite sides. The pair of opposing U shaped vent openings 1233 allow dust and debris to escape out away from the drill bit and the counterbore cutter as they continue to rotate and cut their respective holes.

In FIG. 12B, the collar 833 includes a second track 1224 that when assembled opposes the first track 1212 in the flange of the shaft 831. The ball bearings 1232 of the ring thrust bearing 832 roll around both the first track and second track when the collar 833 is stopped and the hollow rotatable shaft 831 continues to rotate. The collar 833 further includes a ring shaped recess 1228 to receive the snap ring 834. The diameter of the snap ring 834 is reduced by compression to be positioned into the back end of the collar 833 in alignment with the recess 1228. The compression is released and the springiness of the snap ring 834 snaps the diameter of the ring outward into the ring shaped recess 1228.

Figure 12C:
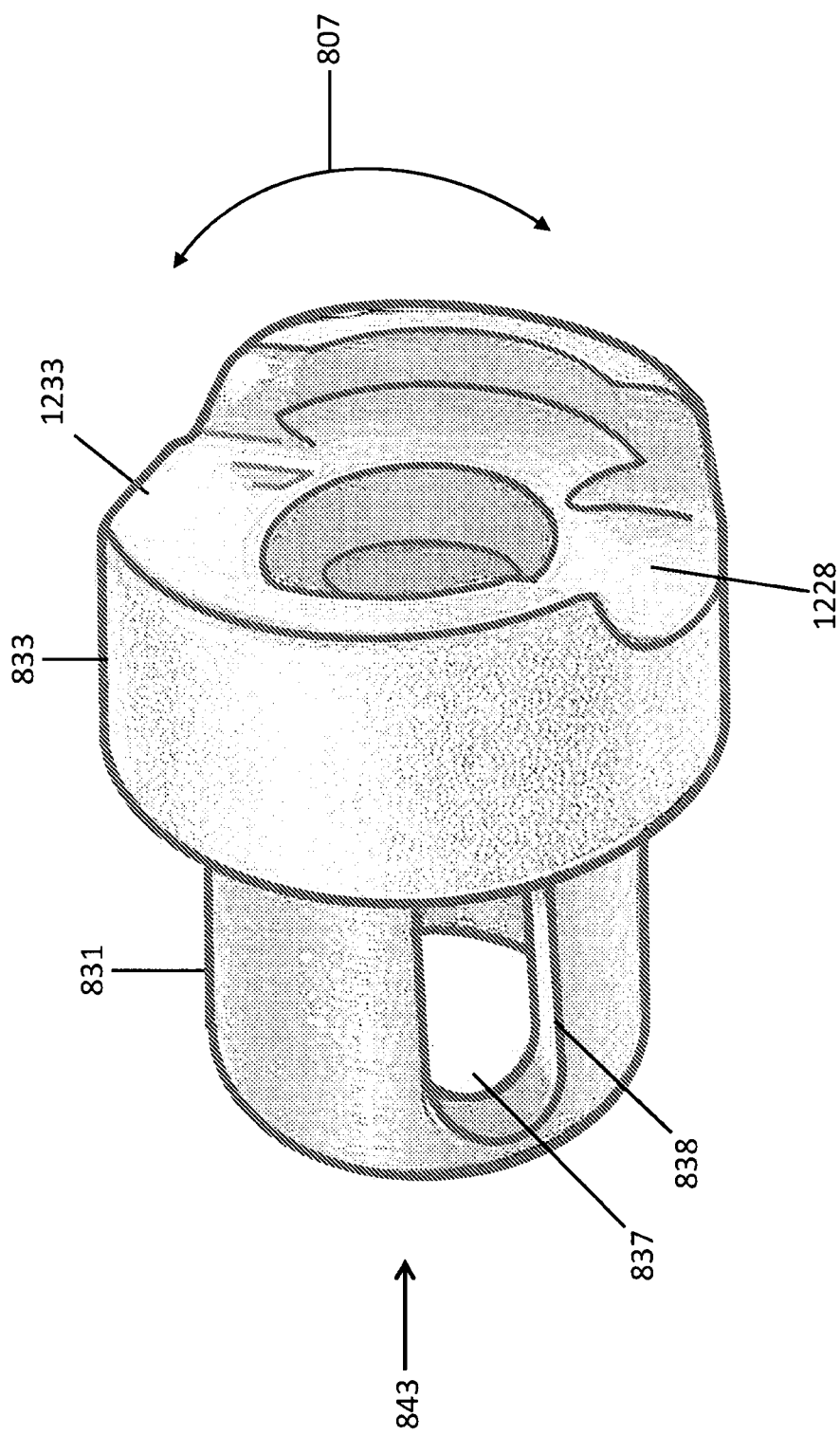
FIG. 12C is an assembled side view of the adjustable rotatable stop collar.

Referring now to FIG. 12C, the rotatable shaft 831, the ring thrust bearing 832, and the collar 833 are rotatably coupled together by the snap ring 834 to form the rotatable adjustable stop collar 803. As indicated by double head arrow 807, the ball bearings in the ring thrust bearing 832 allow the hollow rotatable shaft 831 to rotate with respect to the collar 833 when it stops against a surface. The pair of opposing U shaped vent openings 1233 allow dust and debris to escape out of the holes being drilled with the collar stopped against the surface.

FIG. 13 is a surveyor's kit 1300 including an adjustable counterbore drill bit tool 800 (either 800A or 800B), a tamping tool (compression bar) 1310, and a double ended hex key 1320. The surveyor's kit 1300 may further include one or more precut lead rods 301, one or more circular survey tags 302, and one or more fasteners (nails) 303.

The surveyor's kit 1300 may further include a cloth drawstring bag 1330 with a closeable open end 1311 by pulling on a drawstring 1312 to keep the adjustable counterbore drill bit tool 800 (either 800A or 800B), a tamping tool (compression bar) 1310, and the double ended hex key 1320 readily accessible together. The cloth drawstring bag 1330 may also be used to hold one or more precut lead rods (lead anchors) 301, one or more circular survey tags 302, and one or more fasteners (nails) 303 readily accessible with the adjustable counterbore drill bit tool 800, the tamping tool and double ended hex key 1320.

The counterbore drill bit tool 800 includes a shank to engage a chuck of a power drill to drill the counterbore holes. The counterbore drill bit tool 800 further includes the drill bit 801, the counterbore cutter 802, the rotatable adjustable stop collar 803, and the retention ring 804. The drill bit 801 of the adjustable counterbore drill bit tool 800 drills a center hole of the counterbored hole to a first predetermined depth. The counterbore cutter 802 of the adjustable counterbore drill bit tool 800 cuts an outer hole to a second predetermined depth, shallower than the first, to mount a survey tag below a starting surface of the counterbored hole.

An end of the tamping tool (compression bar) 1310 engages a hammer while the opposite end engages the one or more fasteners 303 and the one or more precut lead rods 301 to mount the one or more survey tags 302. The diameter of the tamping tool 1310 is less than the diameter of the outer counter-drilled hole cut by the counterbore cutter of the adjustable counterbore drill bit tool 800.

The double ended hex key 1320 may be U-shaped to form a handle with a pair of curved up portions. The double ended hex key 1320 has a hexagon drive head at the end of each of the curved up portions. The double ended hex key 1320 includes a first hexagon head at one end to screw drive (rotate) the one or more set screws 826A-826C, each with an internal hex socket, used by the counterbore drill bit tool 800. The one or more set screws 826A-826C are rotated into respective threaded holes in the counterbore cutter to engage the drill bit and hold counterbore cutter coupled to the drill bit. The double ended hex key 1320 includes a second hexagon head, differing from the first hexagon head, at an opposite end. The second hexagon head is used to screw drive (rotate) the fastener 835, having a head with an internal hex socket, used by the counterbore drill bit tool 800. The fastener 835 is rotated into a respective threaded hole in the shaft 821A,821B of the counterbore cutter 802A,802B to hold the shaft 831 of the rotatable stop collar 803 coupled to the counterbore cutter 802A,802B.

Conclusion

There are a number of advantages to the counterbore drill bit. Three quarter inch brass survey tags are installed below a surface to approved depths with high accuracy. With the counterbore drill bit and its stop collar, three quarter inch brass survey tags can be installed in less than a minute. The top surface of the material being bored requires no prior preparation or reference marks before drilling with the counterbore drill bit. Concrete need not be chipped away to set the survey tag, avoiding replacement of damaged concrete. The drill bit tip provides pin-point accuracy and avoids bit walking (without a pilot hole) commonly experienced with standard masonry drill bits. The materials used in forming the counterbore drill bit are strong and durable so that it can be used with rotary hammer drills for quick and effortless installation of the survey tag. The counterbore drill bit requires no water to cool down the drill bit when drilling into hard surfaces, such as masonry for example. The counterbore drill bit can penetrate hard surfaces such as concrete, brick, tile, marble, granite and metal, for example. With one tool drilling multiple holes in one pass, less equipment is needed to efficiently install survey markers with standard tack and tag sizes commonly used in California. Standard three-fourths inch brass survey tags can be used with the counterbore drill bit so that no special order of tags is needed. With the holes drilled by the counterbore drill bit, survey tags are slightly recessed below surface to avoid the survey tag from being scraped off.

While this specification includes many specifics, these should not be construed as limitations on the scope of the disclosure or of what may be claimed, but rather as descriptions of features specific to particular implementations of the disclosure. While the counterbore drill bits disclosed herein are sized in a diameter to cut of a plurality of hole diameters, the counterbore drill bits can be scaled in size to drill other larger diameter holes. Additionally, the cutting head of the counterbore cutter may be modified with slanted cutting teeth in order to form a countersink hole. Furthermore, it is to be understood that the disclosed embodiments are merely illustrative of and not restrictive on the broad invention, and that the disclosed embodiments not be limited to the specific constructions and arrangements shown and described, since various other modifications may occur to those ordinarily skilled in the art. For example, certain features that are described in this specification in the context of separate implementations may also be implemented in combination in a single implementation. Conversely, various features that are described in the context of a single implementation may also be implemented in multiple implementations, separately or in sub-combination. Moreover, although features may be described above as acting in certain combinations and even initially claimed as such, one or more features from a claimed combination may in some cases be excised from the combination, and the claimed combination may be directed to a sub-combination or variations of a sub-combination. Accordingly, the claimed invention is limited only by claims that follow below.

What is claimed is:

1. An apparatus for boring counterbore holes in masonry to a predetermined depth, the apparatus comprising:
    a first drill bit of a first diameter, the first drill bit having a slot near a tip end, a pair of twisted cutting edges extending a first length along an axis from the tip end, and a chuckable shaft extending a second length along the axis from an end of the pair of twisted cutting edges, the chuckable shaft having one or more first groove segments in alignment at a first point around the chuckable shaft;
    a circular cutting tool of a second diameter at a first distance from the tip end, the circular cutting tool concentric with the first drill bit along the axis, the second diameter of the circular cutting tool is greater than the first diameter of the first drill bit;
    a rotatable stop collar of a third diameter having a stop surface at a second distance from the tip end, the rotatable stop collar concentric with the first drill bit and the circular cutting tool along the axis, the rotatable stop collar having a collar configured to engage a surface and allow continued rotation of the circular cutting tool and the first drill bit;
    a retaining split ring to couple into the one or more first groove segments in alignment at the first point around the chuckable shaft of the first drill bit, the retaining split ring to retain the circular cutting tool on the chuckable shaft of the first drill bit;
    an A-frame-shaped blade coupled into the slot of the tip end of the first drill bit, the A-frame-shaped blade having opposing cutting edges; and
    wherein in response to the stop collar, the circular cutting tool forms a first portion of a hole with the second diameter to a first depth and the first drill bit forms a second portion of the hole with the first diameter to a second depth greater than the first depth.

2. The apparatus of claim 1, wherein
each of the opposing cutting edges of the A frame-shaped blade has one or more notched grooves with increasing depth from a first edge to a second edge of the cutting edge.

3. The apparatus of claim 2, wherein
the one or more notched grooves have a V-shape.

4. The apparatus of claim 1, wherein
the circular cutting tool and the rotatable stop collar are adjustable along the length of the first drill bit to set the formation of the second portion of the hole with the first diameter to the second depth.

5. The apparatus of claim 4, further comprising:
    a first plurality of threaded fasteners inserted into a first plurality of threaded holes of the circular cutting tool to couple the circular cutting tool to the first drill bit, and
    a second threaded fastener inserted through an opening of the rotatable stop collar and into a second threaded hole of the circular cutting tool to couple the rotatable stop collar to the circular cutting tool.

6. An adjustable tool for drilling counterbore holes into masonry, the adjustable tool comprising:
    a drill bit of a first diameter, the drill bit having a slot near a tip end, a pair of twisted cutting edges extending a first length along an axis from the tip end, and a solid shaft extending a second length along the axis from an end of the pair of twisted cutting edges, the solid shaft having one or more first groove segments in alignment at a first point around the solid shaft;
    a counterbore cutter of a second diameter adjustably coupled to the drill bit, the counterbore cutter selectively slideable over the solid shaft of the drill bit to adjust a cutting depth of the drill bit forming a first hole, the counterbore cutter having a hollow shaft and a cutting head with a plurality of cutting teeth space apart around the cutting head, the hollow shaft having a plurality of threaded holes to receive a plurality of fasteners to engage the shaft of the drill bit;
    a rotatable adjustable stop collar adjustably coupled to the counterbore cutter, the rotatable adjustable stop collar selectively slideable over the hollow shaft of the counterbore cutter to adjust a cutting depth of the counterbore cutter forming a second hole with a larger diameter of the first hole, the rotatable adjustable stop collar having a collar configured to engage a surface and allow continued rotation of the counterbore cutter and the drill bit;
    a retaining split ring to couple into the one or more first groove segments in alignment at the first point around the solid shaft of the drill bit, the retaining split ring to retain the counterbore cutter on the solid shaft of the drill bit; and
    a blade coupled into the slot of the tip end of the drill bit, the blade having opposing cutting edges.

7. The adjustable tool of claim 6, wherein
the rotatable adjustable stop collar having a hollow rotatable shaft, a ring thrust bearing, and the collar rotatably coupled together, wherein the hollow rotatable shaft has at least one through hole slot to receive a first fastener inserted into a first hole of the threaded holes to adjustably couple the rotatable adjustable stop collar to the counterbore cutter.

8. The adjustable tool of claim 7, wherein
the surface of the hollow rotatable shaft around the at least one through hole slot is flat to engage a head of the first fastener.

9. The adjustable tool of claim 8, wherein
a star washer under the head of the first fastener increases friction with the flat surface of the hollow rotatable shaft around the at least one through hole slot to hold the position of the first fastener in the threaded hole.

10. The adjustable tool of claim 6, wherein
the rotatable adjustable stop collar further has a snap ring coupled to the collar to hold the hollow rotatable shaft, a ring thrust bearing, and a collar rotatably coupled together.

11. The adjustable tool of claim 6, wherein
the counterbore tool further has second fastener to thread into a second threaded hole of the threaded holes to couple the counterbore tool to the solid shaft of the drill bit.

12. The adjustable tool of claim 6, wherein
the blade is a flat A-Frame shape blade; and
each of the opposing cutting edges of the flat A frame shaped blade has one or more notched grooves with increasing depth from a first edge side to a second edge side of the cutting edge, the one or more notched grooves to deter run out of the drill bit.

13. The adjustable tool of claim 12, wherein
the one or more notched grooves have a V-shape, a U-shape, or a semi-circle shape.

14. The adjustable tool of claim 12, wherein
a diameter of the cutting head of the counterbore cutter is configured to cut the second hole with a diameter to received a survey tag; and
a diameter of the drill bit is configured to cut the first hole with a diameter to receive a lead rod.

15. The adjustable tool of claim 12, wherein
the shaft of the drill bit includes a shank to chuck the tool into a power drill.

16. The adjustable tool of claim 15, wherein
the shank is one of a brace shank, a straight shank, a hex shrank, a special direct system (SDS) shank, a three-flat triangle shank, a spline drive shank, a morse taper shank, a square shank, or a threaded shank.

17. The adjustable tool of claim 15, wherein
the shaft of the drill bit further includes a neck between the shank and the tip.

18. The adjustable tool of claim 17, wherein
the neck is circular cylindrical neck with a circular cross section, a hexagon cylindrical neck with a hexagon cross section, or a triangle cylindrical neck with a three-flat cross section.

19. The adjustable tool of claim 17, wherein
the cutting head has a ring shaped flange or base with four U-shaped openings spaced apart from each other by ninety degrees around the ring shaped flange or base;
the plurality of cutting teeth are four tungsten carbide cuboid blades brazed into the four U-shaped openings in the ring shaped flange or base with a braze alloy and spaced apart from each other by ninety degrees around the ring shaped flange or base; and
the ring shaped flange or base has a ramp segment formed between each of the four carbide cuboids to allow the release of cut material.

* * * * *